United States Patent
Reed

(10) Patent No.: US 10,430,712 B1
(45) Date of Patent: Oct. 1, 2019

(54) COGNITIVE PLATFORM FOR USING KNOWLEDGE TO CREATE INFORMATION FROM DATA

(71) Applicant: Goldman, Sachs & Co., New York, NY (US)

(72) Inventor: Carl Reed, Tenafly, NJ (US)

(73) Assignee: Goldman Sachs & Co. LLP, New York, NY (US)

(*) Notice: Subject to any disclaimer, the term of this patent is extended or adjusted under 35 U.S.C. 154(b) by 940 days.

(21) Appl. No.: 14/613,111

(22) Filed: Feb. 3, 2015

Related U.S. Application Data

(60) Provisional application No. 61/935,214, filed on Feb. 3, 2014.

(51) Int. Cl.
*G06F 7/00* (2006.01)
*G06F 17/30* (2006.01)
*G06N 5/04* (2006.01)

(52) U.S. Cl.
CPC ..................... *G06N 5/04* (2013.01)

(58) Field of Classification Search
CPC ......... G06F 17/30637; G06F 17/30675; G06F 17/30734; G06F 17/30507; G06F 17/30389; G06F 17/30297; G06F 17/30958; G06F 17/30575
See application file for complete search history.

(56) References Cited

U.S. PATENT DOCUMENTS

| | | | | |
|---|---|---|---|---|
| 7,873,619 B1* | 1/2011 | Faibish | ................... | G06F 16/13 707/705 |
| 7,895,359 B2* | 2/2011 | Reed | ....................... | G06F 9/542 709/238 |
| 8,583,589 B2* | 11/2013 | Kolovski | ............... | G06N 5/046 706/55 |
| 8,739,112 B1* | 5/2014 | Reed | ...................... | G06Q 10/10 717/101 |
| 2006/0235823 A1* | 10/2006 | Chong | .............. | G06F 17/30557 |

(Continued)

OTHER PUBLICATIONS

ISO/IEC, "Information Technology—Common Logic (CL): A Framework For A Family Of Logic-Based Languages," First Edition, Publication No. 24707, 80 pages, Oct. 1, 2007.

(Continued)

*Primary Examiner* — Binh V Ho

(57) ABSTRACT

A cognitive platform, systems and methods for using knowledge to create information from data are disclosed. A cognitive stack supports the separation of enterprise knowledge, information and data into three distinct layers. The cognitive stack provides a curated representation of knowledge as an authoritative enterprise system of truth, which can be applied to enterprise relevant data to create meaningful enterprise information in a timely, scalable and sustainable fashion. In an embodiment, the system implements a transmission methodology capable of providing a knowledge contract to independent information creation agents, a horizontally scalable data transformation methodology for creating raw semantically normalized information from disparate data sources and a materialization methodology for creating flexible representations of addressable information structures from a single enterprise information store to support multiple enterprise cognitive use cases.

20 Claims, 11 Drawing Sheets

(56) References Cited

U.S. PATENT DOCUMENTS

| | | | | |
|---|---|---|---|---|
| 2007/0011125 A1* | 1/2007 | Angele | ............... | G06N 5/045 706/46 |
| 2009/0171720 A1* | 7/2009 | Crook | ................ | G06Q 10/04 705/35 |
| 2010/0138698 A1* | 6/2010 | Angele | ........... | G06F 17/30507 714/37 |
| 2011/0238610 A1* | 9/2011 | Lee | ............... | G06F 17/30424 706/50 |
| 2012/0096171 A1* | 4/2012 | Suit | ................. | H04L 12/6418 709/227 |
| 2012/0116559 A1* | 5/2012 | Davis | ................... | G06F 3/002 700/94 |
| 2012/0254102 A1* | 10/2012 | Li | ...................... | G06Q 10/10 706/58 |
| 2013/0124574 A1* | 5/2013 | Brettin | ............ | G06F 17/30958 707/798 |
| 2014/0156587 A1* | 6/2014 | Momtchev | ....... | G06F 17/30592 707/600 |
| 2014/0207712 A1* | 7/2014 | Gonzalez Diaz | ..... | G06N 5/025 706/12 |
| 2015/0278699 A1* | 10/2015 | Danielsson | ........... | G06F 8/313 706/47 |
| 2016/0028758 A1* | 1/2016 | Ellis | ..................... | G06F 21/52 726/25 |

OTHER PUBLICATIONS

W3C, "Semantic Web," http://www.w3.org/standards/semanticweb/, 9 pages, 2015.

\* cited by examiner

… (1)

COGNITIVE PLATFORM FOR USING KNOWLEDGE TO CREATE INFORMATION FROM DATA

CROSS-REFERENCE TO RELATED APPLICATION(S)

The present application claims priority to and benefit from U.S. Provisional Application No. 61/935,214 titled "Cognitive Platform For Using Knowledge To Create Information From Data" filed on Feb. 3, 2014, the entire content of which is expressly incorporated by reference herein.

BACKGROUND

Businesses, organizations, and various other types of entities (each hereinafter an "enterprise") do not make business decisions just based on one factor, such as interest rate or revenues. Instead, enterprises generally rely on a total view when making business decisions such as, for example, how much to invest in research and development or whether to expand into a new market. Consequently, enterprises generally value the ability to integrate information from multiple perspectives for decision-making. Enterprises are prolific consumers of information technology and operate in an information ecosystem that has been experiencing an exponential growth in data volume over time. "Big data"—the storage and analysis of massive and/or complex data sets, has emerged as a solution to deal with this vast amount of data.

Existing "big data" technologies attempt to converge massive amounts of data. Although the value of data that can be linked with other data is tremendous, such strategy is neither physically nor temporally feasible. Besides the scale, big data can include data from different sources, and each source can produce data of different types or formats. Many existing technologies, even if they can handle the scale, have difficulty handling data that exists in different formats (e.g., structured, semi-structured, unstructured), hosted across different infrastructures (e.g., cloud, mainframe, custom-hardware), in different databases, and/or using different schemas.

Existing "big data" technologies also have difficulties managing knowledge at the enterprise level. For example, the information technology environment of an enterprise can include multiple computer systems that may be functionally and/or geographically diverse. Each such system can generally manage its data, information and knowledge in a specific way to achieve its goals. Moreover, at the system level, information technology systems are typically optimized for data storage and retrieval, and in some cases, specific types of analysis (e.g., report generation). In such a multi-system architecture with system-level optimizations, integrating the underlying systems is generally difficult and may require data integration or schema manipulation. However, such techniques are generally complex and time consuming.

As a consequence of these and other limitations of existing "big data" technologies, enterprises have limited ability to discover valuable information that can give them an edge in the competitive environment.

SUMMARY

In some embodiments, the disclosed system can operate in a distributed parallel processing environment that can include multiple processors. The system can retrieve source data of interest from a repository of a set of data (i.e. datastore), and convert the source data into raw Resource Description Framework (RDF) triples by applying RDF triple mappings. The system can further convert the raw RDF triples into knowledge model RDF triples by applying semantic transform rules provided by a knowledge model. The system can then write the knowledge model RDF triples to a high throughput file system. By providing a normalized and semantically consistent representation of the source data in the form of knowledge model RDF triples, the system can optimize the performance of user queries and inference queries. For example, when the system receives a query representing a forward inference rule based on the knowledge model, the system can apply the forward inference rule to a collection of knowledge model RDF triples to infer new knowledge model RDF triples in a fast and efficient manner.

In some embodiments, the disclosed system comprises a first datastore storing information structures that are based on a knowledge model and a computer system coupled to the datastore. As used herein, the term "engine" refers to a mechanism manifested as software, firmware, hardware or any combination therewith. The computer system can have an inference engine that is configured to receive in query form inference rules based on the knowledge model and apply the inference rules to the information structures stored in the datastore to infer new information structures. The system can also comprise a second datastore that stores a collection of information structures. A portion of the collection of information structures can be loaded from the second datastore to the first datastore to enable the inference engine to infer the new information structures. In some implementations, the new information structures can be added to the collection of information structures in the second datastore. The system can also include multiple processors operating in parallel to convert source data via a first and second transforms based on the knowledge model into the collection of information structures stored in the second datastore. The first transform converts the source data into raw Resource Description Framework (RDF) triples using a mapping language, and the second transform applies semantic rules based on the knowledge model to convert the raw RDF triples into the collection of information structures that represent relational data in a semantically consistent and normalized fashion.

In some embodiments, the system includes a knowledge system implemented on a server, and one or more information agents that are in communication with the knowledge system and have access to multiple data sources, and an information store or repository coupled to the one or more information agents. An information agent is configured to receive a knowledge contract in a machine readable form from the knowledge system and use the knowledge contract to create information objects from at least one data source of interest. The information objects that are created are then stored in the information store. In some implementations, the information agent can be further configured to use the knowledge contract to create a new information object, which can then be added to a collection of information objects stored in the information store.

DETAILED DESCRIPTION

Figure 1:
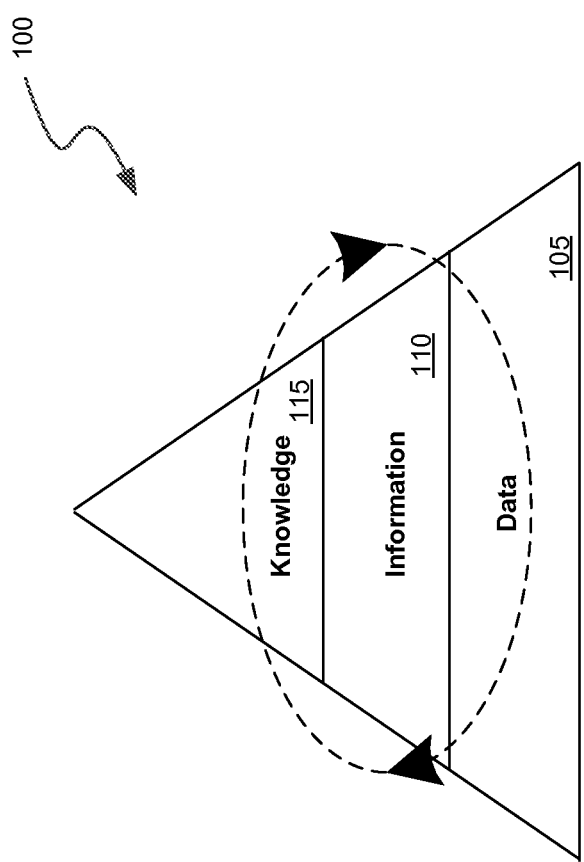
FIG. 1 is a block diagram illustrating a basic cognitive hierarchy.

In accordance with the present disclosure, a technology for creating relevant or meaningful information in a timely, scalable and sustainable manner from otherwise large quantities of disparate and disjoint data is disclosed. The disclosed technology enables an enterprise to formally manage its knowledge as an enterprise asset capable of driving the autonomous creation of relevant information from otherwise very large quantities of disparate and disjoint data.

The disclosed technology overcomes the disadvantages of existing "big data" technologies by converging knowledge, rather than data, of an enterprise into a single manageable representation, and doing so in a way that does not constrain the ongoing evolution of the knowledge. The disclosed technology recognizes that knowledge does not exhibit the same consistently exponential growth rates of data. The growth of knowledge is more asymptotic exhibiting very early exponential growth that quickly starts tending towards a longer term plateau. The knowledge driven approach to "big data" taken by the disclosed technology thus provides a more sustainable and scalable solution to "big data" by delivering a manageable number of concepts and associated relationships representative of an enterprise's formally modelled interests at a point in time. The disclosed technology uses the concepts, relationships and rules representing the knowledge as a deductive framework for creating enterprise relevant information and a semantic foundation for quantitative analytics to inductively create new knowledge from data.

The disclosed technology is based on an architecture of a cognitive stack that supports the separation of enterprise knowledge, information and data into three distinct layers. In some embodiments, the knowledge representation is founded on the ISO/IEC "Common Logic" Standard #24707:2007 herein incorporated by reference in its entirety and the information representation is graphical with vertex representations of knowledge concepts and edge representations of relationships. Integration between the layers leverage the World Wide Web Consortium (W3C) Semantic Web stack which builds on the W3C's Resource Description Framework (RDF). In some embodiments, the framework disclosed herein can be repurposed as a knowledge protocol capable of representing a knowledge contract that provides the specification of an enterprise information vocabulary, syntax and structure to autonomous information generation agents. The resulting information structures generated by the autonomous information generation agents provide a fully integrated and semantically normalized enterprise asset that can support the resolution of new and/or complex business questions such as, but not limited to the following:

1. What are the enterprise's business dependencies on particular technology components?
2. Where does an enterprise need to apply better controls to mitigate business risk?
3. Does an enterprise have business to business dependencies that the enterprise does not know about?
4. How are an enterprise's markets actually behaving compared to what the enterprise thinks is happening?
5. Is there a correlation between behavior and opportunity?
6. Who is potentially communicating with who about what?

By enabling an enterprise to answer these questions, the disclosed technology provides the enterprise a corporate "information edge" that could be leveraged as a commercial differentiator and competitive advantage.

The following description provides specific details for a thorough understanding and an enabling description of various embodiments and implementations. One skilled in the art will understand, however, that the embodiments may be practiced without many of these details. Additionally, some well-known structures or functions may not be shown or described in detail, so as to avoid unnecessarily obscuring the relevant description of the various embodiments and implementations. The terminology used in the description presented below is intended to be interpreted in its broadest reasonable manner, even though it is being used in conjunction with a detailed description of certain specific embodiments and implementations. It should be noted that the pseudo code has been used in this disclosure to illustrate various examples. The pseudo code is semantically accurate and intended to support the innovative integration aspects.

1. Enterprise Data, Information and Knowledge 1.1. The Cognitive Hierarchy

FIG. 1 is a block diagram illustrating a basic cognitive hierarchy. As illustrated, the basic cognitive hierarchy 100 comprises data 105, information 110 and knowledge 115.

Data, as used herein, is factual and specific and includes an absolute context. It can be contained by the cells (row-column intersections) of structured data sources such as databases, spread sheets, and/or the like, or by the content (e.g., words) of unstructured sources such as documents, email content, twitter, other news, social media sources, and/or the like.

Information, as used herein, is data that has been structured with some kind of context. A database table includes rows describing an instance of the entity represented by the table within the overall context of the entity relationship model represented by the parent database. This also has at minimum a parochial context and relevance to the business process that is managing its lifecycle. For example, a document containing information in natural language that was relevant and meaningful to the author and potentially relevant and meaningful to the right interested reader. Likewise, email, instant messaging, etc., are examples of the exchange of information in natural language between senders and receivers.

Knowledge, as used herein, is an authoritative truth at a point in time that defines the concepts, relationships and governing rules within the context of a subject domain. The enterprise knowledge and expertise of a large diverse enterprise generally evolves in an inherently distributed and decentralized fashion, with a correspondingly disjoint distribution of associated data and information, (section 1.2). The full cognitive potential of the enterprise needed to fully leverage its distributed internal and interesting external "big Data" thus depends on its ability to converge its knowledge into a single manageable representation without constraining its ongoing evolution.

Various mode of inferences can be applicable to the cognitive hierarchy. For example, deductive reasoning is a mode of inference where the application of existing knowledge 115 as a "truth" defining axiom or premises as a basis for the logic derivation of information 110 from data 105. Inductive reasoning is another mode of inference where the analysis of content (e.g., observable data or information) to discover interesting information patterns leading to the hypothesis of new theories that extend, validate or challenge existing knowledge. Abductive reasoning is another mode of inference which is the explanation of an observation by applying the most probable hypothesis. For example, the machine is hot because it is being heavily used! (most likely, but the cooling system could be broken).

1.2. An Example Enterprise Information Technology Ecosystem

Figure 2:
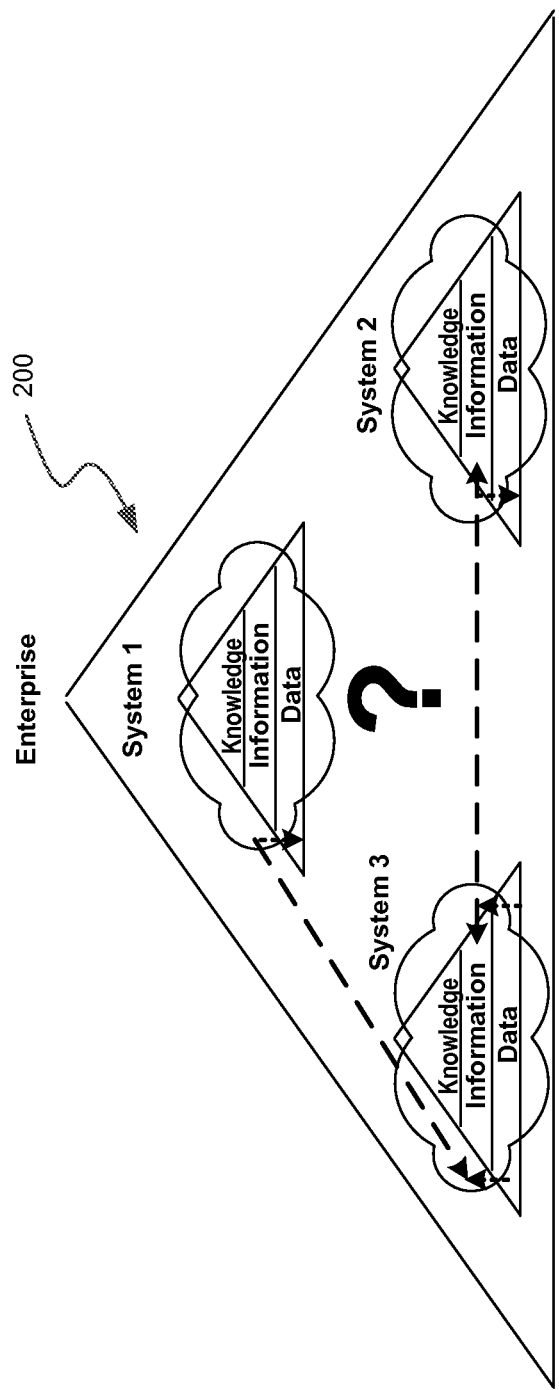
FIG. 2 is a block diagram illustrating systems of an enterprise.

FIG. 2 is a block diagram illustrating systems of an enterprise without an enterprise cognitive hierarchy. The information technology ecosystem of a large diverse enterprise can be composed of multiple computer systems (e.g., systems 1-3 in FIG. 2) implementing discrete business processes. Each computer system tends to be responsible for managing its own parochial cognitive hierarchy of data, information and knowledge. Knowledge is typically managed as a direct cognitive partnership between the parochial business and information technology expertise and is generally not formally represented. This style of vertical alignment optimizes the evolutionary agility within each vertical. However, it can make finding and aggregating knowledge at the enterprise level difficult.

From an enterprise vantage point the relationship between business processes and therefore their implementing computer systems is often a recursive aggregation. However, the enterprise integration of the relevant underlying computer systems is almost exclusively information based via an agreed exchange protocol and participating system data transforms. There is no cognitive integration across computer systems and consequently any formal representation of an enterprises cognitive hierarchy.

Without a combined cognitive hierarchy properly representing the convergence of otherwise disjoint enterprise knowledge and expertise, an enterprise cannot optimally scope its enterprise level data interests as an input for reasoning meaningful cross-business, cross-system information via any kind of enterprise "big data" or "big analytics" strategy.

The disclosed technology enables an enterprise to leverage its combined enterprise knowledge and expertise to create meaningful information across business lines, operating environments, clients, risks, controls, etc., and thereby develop an "information edge" that can be used as a competitive advantage.

1.3. A Knowledge Driven Functional Architecture

Figure 3:
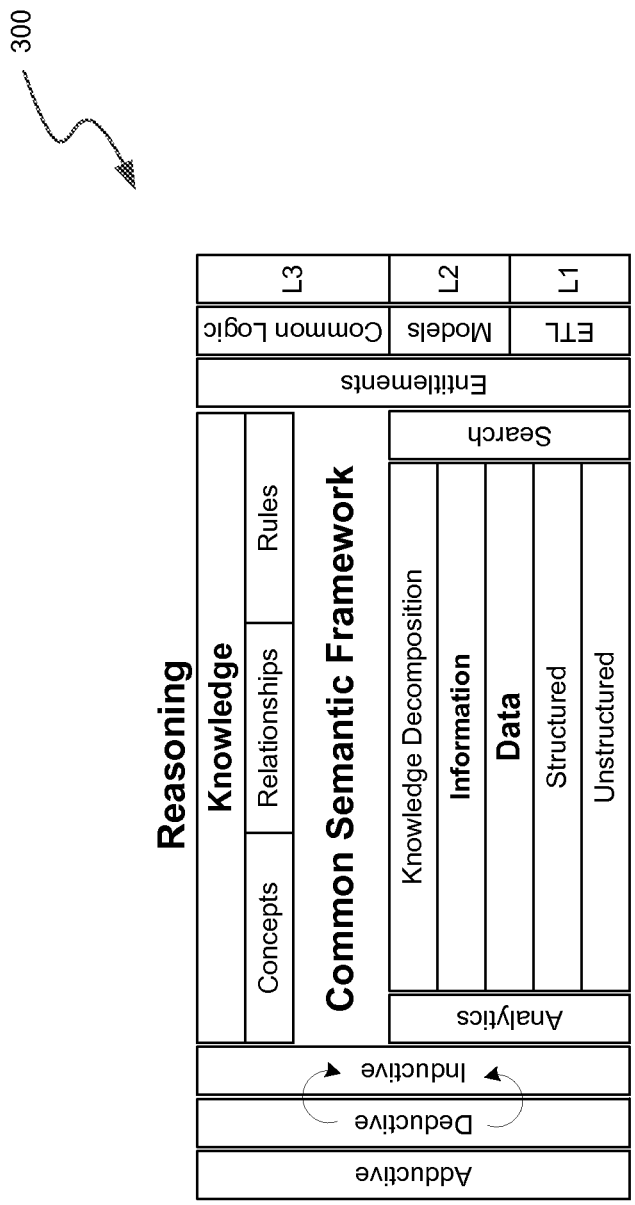
FIG. 3 is a block diagram illustrating a functional architecture of a cognitive platform of an enterprise in accordance with the some embodiments of the disclosed technology.

FIG. 3 is a block diagram illustrating a functional architecture of a cognitive platform of an enterprise in accordance with the disclosed technology. The functional architecture delivers an enterprise cognitive capability that is agnostic to the enterprise size, type or industry sector. The cognitive reasoning capability of any enterprise is its ability to leverage its enterprise knowledge to create "useful" information from accessible data.

The cognitive platform 300 depicted in FIG. 3 is split into three physically separate layers L1, L2 and L3 which are described below.

Enterprise knowledge layer (L3) is a single curated representation of enterprise knowledge that provides an authoritative definition of enterprise relevant concepts, relationships and rules in a common semantic framework and associated enterprise vocabulary.

In some embodiments, the enterprise knowledge Common Logic implementation (described in section 1.4 below) is capable of:

(1) providing authoritative knowledge as reference models for use by external applications, and (2) applying its knowledge via reasoning or "inference" new information across accessible L2 and L1 content.

The L3 knowledge implementation is a technology implementation (e.g., knowledge system 835 described in FIG. 8) that is responsible for providing a fully integrated knowledge solution. The knowledge implementation provides all the relevant tools and interfaces to converge, curate, entitle and use relevant enterprise knowledge as it evolves across an organization.

Enterprise Information layer (L2) includes information that has been generated outside of the L3 knowledge layer. A knowledge reference model serves as a bi-directional contract between these two layers. This model can be generated by the knowledge implementation and transferred in a machine readable form to any L2 agent requiring authoritative knowledge to execute its underlying business function. Examples, of L2 agents include, but are not limited to: information graph generation ("Big Graph", see section 1.6 below), enterprise natural language processing and domain oriented disambiguation, semantic search engine implementations, and/or the like.

The layer 2 knowledge decomposition, (see section 1.4 below), of this model can provide:

(1) The enterprise semantic vocabularies, concepts, attribute relationships and transforms required to extract L1 data and construct semantically consistent information objects.

(2) The relationship semantics and associated rules required to generate the enterprise relationships of interest between information objects.

(3) Lexicons containing enterprise synonym sets and associated knowledge concepts.
(4) Any reference knowledge graphs or ontologies required for L2 agent optimization.

In some embodiments, any L2 information created from L1 data can be encoded with the appropriate L1 provenance.

Enterprise data layer (L1) represents internally and externally accessible data of enterprise interest. L1 data sources can include, but are not limited to: structured data managed by enterprise computer systems and processes (section 1.2), communication media like email, instant messaging, Twitter, LinkedIn, LexisNexis, etc., internal and external documents such as reports, research, FAQ's, etc., reference data from internal or external taxonomies or ontologies, and/or the like. In some embodiments, L1 data layer includes any relevant data that is defined as useful by a self-perpetuating enterprise cognitive ability to formally apply its knowledge to generate a commercial edge of differentiating information.

1.4 The Knowledge Implementation

In some embodiments, the knowledge representation managed in L3 is enterable and retrievable as a formal data model authored in a formalized modeling language. The modeling formalism provides the expressive power to capture all the required content types (Concepts, Relationships, and Rules) and is capable of accommodating their ongoing evolution over time.

UML (Universal Modeling Language) is a popular formalism for modeling basic concepts and relationships. However, it does not support a formal representation of "rule" and therefore cannot formally represent the important knowledge artifacts of "axiom" or "premise". This limitation also extends to entity-relationship style models that are arguably less expressive than UML.

In some embodiments, the knowledge model can be based on Ontology Languages. These range from the weakly expressive web-tagging oriented Resource Description Framework (RDF) and Resource Description Framework Schema (RDFS) languages, to the richer Web Ontology Language (OWL) family, culminating in the powerful Common Logic (CL) class of languages. In some embodiments, the knowledge model can be based on CL as is an Ontology implementation that can properly represent a usable knowledge model, and can provide:

The full expressive power of first order logic enabling the representation of knowledge as individual things and the domain rules that govern the relationships and behavior of each individual.

Part of the expressive power of second order logic supporting the representation of rules that describe properties of categories of concepts and relationships.

Common Logic (CL) is an ISO/IEC Standard #24707: 2007. The "Common Logic" as used herein refers to a full language implementation. Examples of CL include, but are not limited to: KIF, which is implemented in PowerLoom, and CycL which is implemented in the Cyc Knowledge Base. Both implementations provide integrated knowledge stores and query and inference engines.

First order logic enables knowledge engineers to craft relatively compact formulations of domain rules like the following:
R1. If an individual, X, is a director at a commercial organization, A, then X is an insider for A.
R2. If an individual, X, is a member of a group that directly reports to some individual, Y, then X is directly supervised by Y.
R3. If an individual, X, is an insider for a commercial organization, A, then the direct supervisor[s] of that person is [are] also an insider for A.

These rules can be applied individually or collectively to infer new information about group membership, reporting relationships and corporate directorships of the form "X<name> is an insider for company A<name>". For example collectively they can be chained to infer that "Jon Doe" is an insider for commercial organization "Foo" because he supervises a group that has a group member who is a director at "Foo".

Second order logic allows the knowledge engineer to group relationships into classes that define collections of relationships with behavior in common.

For example, many, but not all structured products vary in value as some function of the price of an underlier i.e.,
REL1. PriceDependencyOn(X,Y)
R1. If Value of X changes when price of Y changes then PriceDependencyOn X, Y Now consider the following types of relationship connecting a structured product to an underlier:
REL2. optionOn(X,Y)
REL3. futureOn(X,Y)
REL4. futureOptionOn(X,Y)
REL5. LowVolatilityDerivativeOn(X,Y)
REL6. HighVolatilityDerviativeOn(X,Y)

A first order representation requires an R2 for each of the REL1, REL2, REL3 relationships. That introduces unnecessary duplicity along with the need for a manual process to manage consistency. The knowledge engineer can now use a construct that is unique to second order logic to represent the relationship between the values of "some" structured products and their underliers' price by defining the class PriceCorrelatingRelationship:
CLASS: PriceCorrelatingRelationship
R2. If ?REL is of type PriceCorrelatingRelationship and ?REL(?X,?Y)
then PriceDependencyOn(?X,?Y)

That can now be used to differentiate the behavior in common across REL1, REL2, REL3 from REL4, REL5 via the assertion:
ASSERT: (optionOn, futureOn, futureOptionOn) are of type PriceCorrelatingRelationship The knowledge system can now apply these assertions and associated rules to existing information such as:
PROD-1233 is an optionOn IBMStock
To inferentially generate new information such as:
PROD-1233 has a PriceDependencyOn IBMStock 1.5. Knowledge Content Ingestion In some embodiments, the enterprise knowledge layer implemented with a CL solution is capable of ingesting content directly from sources in either L1 or L2 using the techniques described below.

1.5.1. Direct Content Ingestion:

The knowledge layers CL implementation can ingest content directly from either information or data layer sources. This ingestion process is generally split into an initial point in time ingestion of source content followed by frequent reflection of source changes over time. The CL implementation can map its knowledge concepts directly to the data elements of relevant structured sources.

For example, relational data can be transformed from a source, table, and column representation to a subject, predicate, object representation as part of an explicit data ingestion process. Post the initial ingestion, changes in the source content can be reflected as changes over time that can be explicitly managed as "inserts, updates and deletes" using the same techniques.

Similarly, in some embodiments, other ontologies and taxonomies can be ingested using a common Ontology Web Language (OWL) representation from either internal or external authoritative reference sources. There are multiple examples of public domain reference ontologies such as GICS (Global Industry Classification System) and the CIA's Geo Spatial. The ontologies and taxonomies could be integrated with proprietary enterprise knowledge about client, market influence and organizational structure expanding both enterprise cognitive and semantic search capabilities.

In some embodiments, direct ingestion is recommended for content that needs to be semantically integrated as the reference information as an implicit part of an enterprise ontology. For example, a single integrated representation of the concepts, relationships, rules and associated information instances across domains like geo spatial, industry classifications, organizational structure and business alignment, enterprise goods and services, clients and customers, etc.

1.5.2. Direct Content Ingestion and Forward Inference:

"Forward chaining" describes a technique the CL implementation can leverage to proactively create new information as part of the content ingestion process. This technique can improve query performance by removing the potentially significant latency of having to deduce these structures on demand. The CL implementation can use its inference engine to iteratively apply inference rules annotated as "forward" to any new content being ingested to deduce new assertions. In some embodiments, this technique can be used to create very large information graphs of content contained within the CL implementation represented as very large numbers of new assertions and supporting deductions.

While, initially convenient and quick to market, using the CL implementation to directly generate and manage "Big Graph" may not be feasible at the enterprise scale. Generally the CL implementation may not be capable of creating these types of information structures beyond hundreds of millions of assertions and deductions in a commercially practical timeframe. When extrapolating forward into the billions of assertions and deductions required to support a CL representation of "big graph," the combination of generation time and associated memory footprint can become untenable.

One aspect of the knowledge architecture in accordance with the disclosed technology is the physical separation of the "sparse" knowledge in L3 knowledge implementation from the "dense" information in the L2 Information implementation. In some embodiments, integration between these layers is achieved using "knowledge contracts" that provide L2 information agents with the means to create dense semantically consistent information structures using L3 knowledge models without compromising the scalability and performance of the L3 knowledge implementation. In some embodiments, all L3 knowledge contracts represent the semantic authority of the enterprise knowledge implementation (see section 1.6) to ensure semantic consistency across all L2 information structures and consistent accessibility to direct user queries and L3 inference queries (see section 1.5.3 below).

1.5.3. Remote Content Query Integration

In some embodiments, the knowledge CL implementation can access content from remote sources via direct query. In some embodiments, the required CL to source data mapping is identical to the mappings required for direct ingestion. However, a source proxy can be used to transform the CL query to the native source query representation. The most commonly supported source query languages are SQL for relational sources and SPARQL (SPARQL Protocol and RDF Query Language) for RDF sources.

In some embodiments, query integration can be used as an alternative to the direct ingestion of reference type content. In general, two broad categories of sources can be defined based on applicability or non-applicability of this technique.

Category 1 includes reference sources in the L1 data layer that pre-date the CL knowledge implementation These types of source have generally not been optimally designed to support the intrusion of direct knowledge layer queries from either a performance or security perspective, preferring the direct ingestion and reflection approach outlined in section 1.5.1 above.

Category 2 includes information sources generated by L2 agents using L3 knowledge models. Such content sources are prime candidates for query integration back to the knowledge layer. They provide semantically consistent information and an opportunity to design a source implementation optimized for remote knowledge query performance and security as primary design requirements.

1.6 The Knowledge to Information Development Lifecycle

The L3 knowledge layer is a system of "truth" that serves as a *lingua* franca for Enterprise semantic interoperability. It manages a single authoritative representation of the concepts, relationships and rules, and associated language semantics required to support an external L2 information agent's ability to create enterprise information out of relevant L1 data, (Section 1.3: FIG. 3). By way of a simple illustrative example, consider an organization that is interested in understanding all the possible communication relationships between its employees such as a financial organization seeking to optimize compliance surveillance or a drug company seeking to protect its intellectual property, etc. The resulting information graph could include all the attribute and communication edges between employees, confidential information and potential insider activity vertices. Such an information graph would enable a surveillance implementation to search for graph patterns indicative of the potential flow of non-public information from a confidential source to potential insider activity through existing employee relationship edges as illustrated in FIG. 4.

The resulting graph patterns identify potential flows of non-public information from source to activity via employees. In an embodiment, the graph patterns also form the framework for a more detailed investigative response to determine if the executed activity was actually an insider activity or not. This example will now be used as the context for a deeper dive into the underlying development lifecycle.

1.6.1 Layer 3 Knowledge Modeling in "Common Logic"

Figure 4:
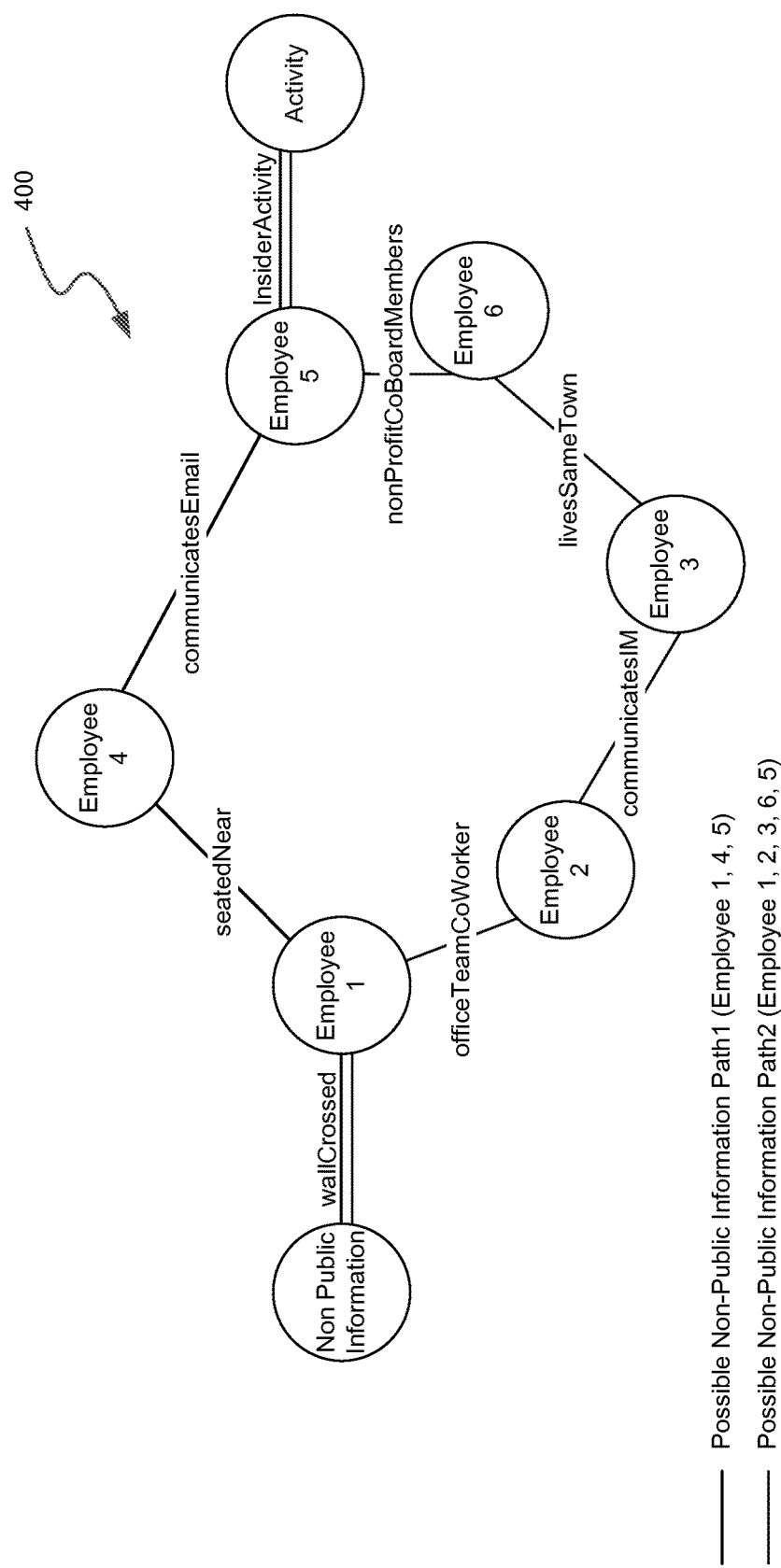
FIG. 4 is a graphical diagram illustrating two potential paths for flow of non-public information in an enterprise in accordance with the some embodiments of the disclosed technology.

The L3 knowledge modeling for supporting the creation of the employee relationship graph needed to support the graph pattern 400 depicted in FIG. 4 is described herein. In this example implementation, when focusing first on the employee teammate relationship, the knowledge implementation needs to be extended to include concepts like Company, Team and Employee.

Assuming the concept of LegalEntity already exists, "Company" can be defined as a sub-collection.

Isa Company Collection genls Company LegalEntity

Similarly for "Team" and OrganizationalEntity.

Isa Team Collection genls Team OrganizationalEntity

And "Employee" as a sub-collection of "Person."

Isa Employee Collection genls Employee Person

Employee first and last name binary predicates, arg1 is type Employee and arg2 is type Name, complete samples of syntax can be seen in examples below.

Isa employeeFirstName (Emp, Fname) BinaryPredicate
Isa employeeLastName (Emp, Lname) BinaryPredicate Recognizing conceptually that an Employee should have a unique identifier, but realizing practically they may not, the concept of a unique identity for an employee across any given union of data domains of interest can be accommodated. If one of the actual identity keys were guaranteed unique across all current and future domains it can be assigned as the primary key. Otherwise a GUID key would need to be generated. These concepts can be modeled generally and then applied whenever necessary.

Create a specialized binary identity predicate type sub collection.
genls BinaryIdentityPredicate BinaryPredicate
    Create a specialized CollectionOfIdentityPredicates as collection of collections.
genls CollectionOfIdentityPredicates CollectionType
    Type cast it as a collection of BinaryIdentityPredicates.
typeGenls CollectionOfIdentityPredicates BinaryIdentityPredicate
    Create a "Generated" universal resource identifier as a sub collection of UniqueIdentifier which is an existing collection that represents a union between a collection of integers and characters.
genls GeneratedURI UniqueIdentifier
    Create a binary predicate to set the primary member as the primary identity in the set.
Isa setPrimaryIdentifier (CollectionUIDs, BinIdPredicate) BinaryPredicate
arg1 CollectionOfIdentityPredicates
arg2 BinaryIdentityPredicate This common identity framework can be applied when modeling an Employee and Employee relationships.

Create an instance of a collection of BinaryIdentityPredicates
Isa EmployeeCollectionOfIdentityPredicates CollectionOfIdentityPredicates
    Further specialize as a collection of EmployeeBinaryIdentityPredicates.
Isa EmployeeBinaryIdentityPredicate EmployeeCollectionOfIdentityPredicates
genls BinaryIdentityPredicate
    Create the identity predicates required as members of the employee collection of employee primary identity predicates.
Isa employeeHumanResourceID (Emp, HRID) EmployeeBinaryIdentityPredicate
arg1 Emp Employee
arg2 HRID UniqueIdentifier
    Isa employeeEmploymentNo (Emp, EmpNo) EmployeeBinaryIdentityPredicate
arg1 Emp Employee
arg2 EmpNo UniqueIdentifier
    This list can be extended over time as requirements evolve to include things like social security number, passport number, or the like.
    Set HR Key as the primary
setPrimaryIdentifier EmployeeCollectionOfIdentityPredicates humanResourceIDForEmployee In this example, the company's human resource function is assumed to be the authoritative source for all company employees and is responsible for assigning each employee a GUID human resource identifier. In instances where this assumption cannot be made or is not desired, an additional identity predicate can be modeled to represent the universal identifier that is generated as the primary employee identifier.

Create the predicate that represents the primary identifier that needs to be generated.
Isa employeeUniversalResourceId (Emp, GenURI) EmployeeBinaryIdentityPredicate
arg1 Employee
arg2 GeneratedURL
    And set as the primary
setPrimaryIdentifier EmployeeCollectionOfIdentityPredicates employeeUniversalResourceId For any given version of the employee model, the collection of N employee identities comprise a consistently generated identity and N−1 isomorphic actual identities indicative of model data domains of interest.

The ability to generate a consistent immutable identity for any concept that is represented by multiple real identifiers in the real world is a valuable graph generation optimization that is further discussed in section 1.6.2 below.

The knowledge modeling example can now be completed by modeling the example employee relationship "officeTeamCoWorker" (see FIG. 4).

Specialization of a Binary Predicate.
genls TimeDependentBinaryPredicate BinaryPredicate
    Specialization of a temporarily qualified relationship.
genls TimeDependentBinaryPredicate TimeDependentRelation
    Create instances of the employee, team, office relationships as temporally qualified predicates.
Isa emplyeeTeamMembership (Employee, Team) employeeTimeDependentBinaryPredicate
Isa employeeOfficeLocation (Employee, Office) TimeDependentBinaryPredicate The concept of time is implicitly managed by the CL implementation. So any binary predicate that one wants to make temporal can be input accordingly. Under these circumstances, the CL implementation actually treats these types as quaternary predicates by automatically managing an additional two temporal arguments to provide a temporal range.

Create an instance of an employee to employee relationship
isa   officeTeamCoWorker   (Employee1,   Employee2) TimeDependentBinaryPredicate Using the following "business definition" of the officeTeamCoWorker relationship: "If two employees are located in the same office and are members of the same team then they are office team coworkers," the equivalent CL knowledge implementation can be defined as an inference rule that can be used to "assert" an instance of an officeTeamCoWorker relationship as the consequent to the corresponding instance of a deductive proof as an antecedent:
Direction: Forward
(Implies
  (and
  (employeeTeamMembership ?Employee1 ?Team1)
  (employeeTeamMembership ?Employee2 ?Team1)
  (Different ?Employee1 ?Employee2)
  (employeeOfficeLocation ?Employee1 ?Office1)
  (employeeOfficeLocation ?Employee2 ?Office1)
  )
  (officeTeamCoWorker ?Employee1 ?Employee2))

The annotation of "forward" states that this rule can be used to proactively assert all instances of the officeTeamCoWorker relationships for any given data scope. "Backward" annotation refers to execution on demand as part of resolving an answer to a question.

The resulting knowledge model in the "enterprise" knowledge base is an authoritative representation of the current information interest in Employee and Employee relationships. As previously described in section 1.5.2, using the CL knowledge implementation can be used to forward inference embedded information graphs in some embodiments. In other embodiments, this model can be used to provide a knowledge contract to independent layer 2 information agents that can apply it against relevant distributed layer 1 data to create an external instance of a semantically integrated information graph as described in detail below.

1.6.2 Extending the Knowledge Model to Support Knowledge Contracts

In some embodiments, the knowledge transfer from the layer 3 CL implementation to any external layer 2 information agent (e.g., knowledge driven information graph generator) provides two constructs:

(1) The transforms required to directly generate semantically consistent information from explicitly identified source data.
(2) The rules needed to "forward inference" new information from the information created above.

Any explicitly targeted source data needs to be transformed into the smallest irreducible representation of information in the information graph. This is as a binary predicate representing a graph "edge" as a relationship between two graph "vertices" that can be represented in the form of a triple as an instance of a "subject/predicate/object". The W3C Resource Description Framework (RDF) is the most widely used "standard" for representing triples and forms a broader foundation for the W3C Semantic Web framework. The Sematic Web is a collaborative movement led by the international standards body called the World Wide Web Consortium (W3C). It provides a common framework that allows data to be shared across multiple types of data boundary like application, enterprise, and industry sector. The implementation premise has been to leverage RDF and the Semantic Web Framework as much as is feasible with an emphasis on integration excellence over building everything from scratch. However, the W3C Semantic Web does introduce some constraints that have to be dealt with in the CL knowledge implementation. For example, the richness of the CL modelling vocabulary needs to be reconciled with the relative constraints of the W3C Semantic vocabulary to be used to communicate a knowledge contract.

The current WC3 Semantic vocabulary supports a basic ontological schema described by an RDF language called OWL and a supporting query language called SPARQL. OWL does not support second order logic and only limited first order constructs significantly constraining its ability to specify rules and consequently its inferential capabilities. OWL is also constrained to binary predicate representations of relationships with very limited support for temporal qualification and no support for temporal reasoning. The OWL web ontology language described in detail in http://www.w3.org/TR/owl2-primer/ and the SPARQL Query Language described in detail in http://www.w3.org/TR/rdf-sparql-query are expressly incorporated by reference herein.

While OWL may or may not be a feasible alternative to the common logic implementation of the layer 3 knowledge model described in section 1.4, in some embodiments, SPARQL is considered as the basis for a feasible standard for the interchange of the necessary contractual knowledge concepts from the CL implementation to external third parties for the purposes of external information creation and/or query integration. Conversely, in some embodiments, a binary predicate constraint may not be imposed on the CL modeling activities. However, some Meta constructs can be implemented in the CL layer that enable generation of the more verbose binary predicate representation to integrate with a SPARQL communication protocol when needed.

Consider the employeeOfficeLocation predicate from the CL knowledge implementation in section 1.6.1.
Isa employeeOfficeLocation (Employee, Office) TimeDependentBinaryPredicate As previously discussed, this is actually a quaternary predicate with an additional two arguments to represent a temporal range. The employeeOfficeLocation relationship can be automatically transformed into a concept and generate a binary predicate to associate each of its quaternary relationship arguments to it. The knowledge model is thus enriched with a way to communicate it without compromising the efficiency and flexibility of developing or using it. Replicating the approach taken in developing the common identity framework (section 1.6.1), a Meta framework that describes the concepts and relationships required to support the binary predicate constraints of the WC3 knowledge contract "protocol" can be created.

Create a collection of non-binary (NB):
genls CollectionOfNBPredicatesToExport CollectionType
    Predicates that need to be conceptualized for exported as part of a knowledge contract for external graph generation.
typeGenls CollectionOfNBPredicatesToExport TimeDependentBinaryPredicate
    Create a way of generating a concept from a non-binary predicate type.
Isa objectClassForRelationship (TimeDependentBinaryPredicate, Collection) BinaryPredicate
    Create a way of binding each argument of the time dependent binary and the start, end temporal qualifications.
Isa arg1PropertyForRelationship (TimeDependentBinaryPredicate, BinaryPredicate) BinaryPredicate
Isa arg2PropertyForRelationship (TimeDependentBinaryPredicate, BinaryPredicate) BinaryPredicate
Isa startPropertyForRelationship (TimeDependentBinaryPredicate, BinaryPredicate) BinaryPredicate
Isa endPropertyForRelationship (TimeDependentBinaryPredicate, BinaryPredicate) BinaryPredicate This framework can then be leveraged to "generate" an instance of a collection of the employee relationships for export,
Isa EmployeeCollectionOfNBPredicatesToExport CollectionOfNBPredicatesToExport
Isa EmployeeExportTimeDependentBinaryPredicate EmployeeCollectionOfNBPredicatesToExport
    and add the example employeeOfficeLocation as a member.
Isa employeeOfficeLocation (Employee, Office) EmployeeExportTimeDependentBinaryPredicate
    A second order (operates on a collection of relationships) forward rule can now be built to generate the following conceptual representation of the quaternary predicate,
Isa EmployeeOfficeLocationClass Collection
Isa employeeEmployeeOfficeLocation (EmployeeOfficeLocationClass, Employee) BinaryPredicate
Isa officeEmployeeOfficeLocation (EmployeeOfficeLocationClass, Office) BinaryPredicate
isa startEmployeeOfficeLocation (EmployeeOfficeLocationClass, StartDate) BinaryPredicate
isa endEmploymentOfficeLocation (EmployeeOfficeLocationClass, EndDate) BinaryPredicate
    and execute the associated bindings.
objectClassForRelationship (employeeOfficeLocation, EmployeeOfficeLocationClass)
arg1PropertyOfficeLocation (employeeOfficeLocationClass, employeeEmployeeOfficeLocation)
arg2PropertyOfficeLocation (employeeOfficeLocationClass, officeEmployeeOfficeLocation)

startPropertyForRelationship (employeeOfficeLocation-Class, StartDate) endPropertyForRelationship (employeeOfficeLocationClass, EndDate)

The binary predicate representation generated above allows for a WC3 Semantic representation of the concepts and relationships that an external agent can generate via direct mappings to data.

1.6.3 Using a Knowledge Contract to Transform Relational Data into Triples

Consider the following representation of the example enterprise relational data shown in Tables 1-3 below that would be relevant to the Employee relationship model example from above. Such data would be managed authoritatively in L1 layer of the Knowledge Architecture (Section 1.2, FIG. 3) within its own systems knowledge domain (Section 1.2, FIG. 2).

TABLE 1

Source: DB1 TABLE: Emp (Primary Key: Core HR Identity)

| First Name | Last Name | Employment Number | Core HR Id |
|---|---|---|---|
| Jon | Doe | 0050 | 123 |
| Jane | Doe | 0101 | 223 |

TABLE 2

Source: DB2 TABLE: Emp Loc (Primary Key: Core HR Identity)

| Core HR Id | Office | Start Date | End Date |
|---|---|---|---|
| 123 | Office1 | Nov. 1, 2013 | INFINITY |
| 223 | Office1 | Nov. 1, 2012 | INFINITY |

TABLE 3

Source: DB3 TABLE: Emp Teams (Primary Key: Employee Number)

| Empl Num | Team | Start Date | End Date |
|---|---|---|---|
| 0050 | Team6 | Nov. 1, 2011 | INFINITY |
| 0101 | Team6 | Nov. 2, 2012 | INFINITY |

The disclosed technology creates "raw" triple representatives of this relational data using the sources' relational schema as the knowledge context and then semantically transforms the raw triple representatives into a triple representation that is consistent with the knowledge model. Tables 4-6 below show contrasting triples generated without ("raw triples") and with an enterprise knowledge contract ("knowledge model driven triples" or knowledge model RDF triples).

TABLE 4

Source: DB1 TABLE: Emp

| Raw Triples | | | Knowledge Model Driven Triples | | |
|---|---|---|---|---|---|
| Subject (Row) | Predicate | Object | Employee | Predicate | Object |
| EMP_123 | First_Name | Joe | EMP_123 | employeeFirstName | Joe |
| EMP_123 | Last_Name | Doe | EMP_123 | employeeLastName | Doe |
| EMP_123 | Emp_Num | 0050 | EMP_123 | employeeEmploymentNumber | 0050 |
| EMP_123 | Core_HR_Id | 123 | EMP_123 | employeeHumanResourceId | 123 |
| EMP_223 | First_Name | Jane | EMP_223 | employeeFirstName | Jane |
| EMP_223 | Last_Name | Doe | EMP_223 | employeeLastName | Doe |
| EMP_223 | Emp_Num | 0101 | EMP_223 | employeeEmploymentNumber | 0101 |
| EMP_223 | Core_HR_Id | 223 | EMP_223 | employeeHumanResourceId | 223 |

TABLE 5

Source: DB2 TABLE: Emp Loc

| Raw Triples | | | Knowledge Model Driven Triples | | |
|---|---|---|---|---|---|
| Subject (Row) | Predicate | Object | EmployeeOfficeLocation | Predicate | Object |
| EMP_LOC_123 | Core_HR_Id | 123 | EMP_LOC_123_Office1_11/1/13 | employeeEmployeeOfficeLocation | EMP_123 |
| EMP_LOC_123 | Office | Office1 | EMP_LOC_123_Office1_11/1/13 | officeEmployeeOfficeLocation | Office1 |
| EMP_LOC_123 | Start_Date | Nov. 1, 2013 | EMP_LOC_123_Office1_11/1/13 | startEmployeeOfficeLocation | Nov. 1, 2013 |
| EMP_LOC_123 | End_Date | INFINITY | EMP_LOC_123_Office1_11/1/13 | endEmployeeOfficeLocation | INFINITY |
| EMP_LOC_223 | Core_HR_Id | 223 | EMP_LOC_223_Office2_11/1/12 | employeeEmployeeOfficeLocation | EMP_223 |
| EMP_LOC_223 | Office | Office1 | EMP_LOC_223_Office2_11/1/12 | officeEmployeeOfficeLocation | Office2 |
| EMP_LOC_223 | Start_Date | Nov. 1, 2012 | EMP_LOC_223_Office2_11/1/12 | startEmployeeOfficeLocation | Nov. 1, 2012 |
| EMP_LOC_223 | End_Date | INFINITY | EMP_LOC_223_Office2_11/1/12 | endEmployeeOfficeLocation | INFINITY |

TABLE 6

Source: DB3 TABLE : Emp Teams

| Raw Triples | | | Knowledge Model Driven Triples | | |
|---|---|---|---|---|---|
| Subject (Row) | Predicate | Object | EmployeeTeamMembership | Predicate | Object |
| EMP_TEAM_0050 | Emp_No | 0050 | EMP_TEAM_123_Team6_11/1/11 | employeeEmployeeTeamMembership | EMP_123 |
| EMP_TEAM_0050 | Team | Team6 | EMP_TEAM_123_Team6_11/1/11 | teamEmployeeTeamMembership | Team6 |

TABLE 6-continued

Source: DB3 TABLE : Emp Teams

| Raw Triples | | | Knowledge Model Driven Triples | | |
|---|---|---|---|---|---|
| Subject (Row) | Predicate | Object | EmployeeTeamMembership | Predicate | Object |
| EMP_TEAM_0050 | Start_Date | Nov. 1, 2011 | EMP_TEAM_123_Team6_11/1/11 | startEmployeeTeamMembership | Nov. 2, 2012 |
| EMP_TEAM_0050 | End_Date | INFINITY | EMP_TEAM_123_Team6_11/1/11 | endEmployeeTeamMembership | INFINITY |
| EMP_TEAM_0101 | Emp_No | 0101 | EMP_TEAM_223_Team6_11/1/11 | employeeEmployeeTeamMembership | EMP_223 |
| EMP_TEAM_0101 | Team | Team6 | EMP_TEAM_223_Team6_11/1/11 | teamEmployeeTeamMembership | Team6 |
| EMP_TEAM_0101 | Start_Date | Nov. 2, 2012 | EMP_TEAM_223_Team6_11/1/11 | startEmployeeTeamMembership | Nov. 2, 2012 |
| EMP_TEAM_0101 | End_Date | INFINTY | EMP_TEAM_223_Team6_11/1/11 | endEmployeeTeamMembership | INFINITY |

The transforms for creating the knowledge driven triples can be characterized as a scale out operation in some embodiments. Because there are generally no significant synchronization dependencies between the transform implementations creating these triples, the disclosed technology can utilize a Hadoop or other hybrid style parallelization frameworks in creating the knowledge driven triples.

The knowledge contract that can be generated from the extended knowledge model (section 1.6.2) to drive the semantic transforms required to generate the triples presented in tables 4-6 will now be described.

In some embodiments, the knowledge contract can be decomposed into 3 three key artifacts:
(1) Raw RDF triple mappings for the source data.
(2) WC3 RDF classes required.
(3) Transform rules to convert the raw triples into knowledge driven triples.

These artifacts drive a transformer process horizontally scaled out across a Hadoop style processing environment, where each transformer instance operates on a row of the relational data executing the processing pipeline functionally defined below.

In Memory Start (Single Relational Row)
 1) Transform Relational to Raw RDF
    Apply Raw Triple Mappings
 2) Transform Raw to Knowledge Triples
    Apply Transformer Rules
    Generate Specified RDF Output Classes
 3) Write Out Knowledge Triples (HDFS)
Complete The WC3 stack can be leveraged to represent each of the knowledge contracts as described below.

Artifact 1: Raw RDF Triple Mapping. The WC3 Semantic Web stack provides the D2RQ Mapping Language that is a declarative language for describing the relationship between a relational database schema and a basic ontological schema described by an RDF language called OWL (section 1.6.2). The WC3 Semantic Web D2RQ Mapping language described in detail in http://d2rq.org/d2rq-language#introduction is expressly incorporated by reference herein.

Examples of some of the basic D2RQ constructs required for the example discussed are presented below.
  Create a RDF class to represent a row in the target Src: DB1 Table: Emp (Table 1 above). The mapping below enables creation of instances of the RDF class, Employee out instances of rows from the DB1.Employee table (Table 1).
Map: DB1_EMP
a d2rq:ClassMap;
d2rq:class vocab:Employee;
d2rq:classDefinitionLabel "Emp"
d2rq:dataStorage map:DB1
  Create a unique URI for each row using values from the Core HR Identity Primary Key column.
d2rq:uriPatern "http://example/Employee/@@EMP_.Core_HR_Id@@"

Then for the tables column mappings:
  Property bridges are used to map column values as a property to an existing RDF class representation created above via the belongstoClassMap.
map:DB1_EMP_CORE_HR_ID
a d2rq:PropertyBridge;
d2rq:belongsToClassMap map:EMP
  Define the relational column for table via table.column.
d2rq:column "Emp.Core HR Id"
  Define the corresponding RDF property
d2rq:property vocab: Core_HR_Id
  Each row of the Employee table represents an Employee subject with a "Core_HR_Id" verb as the predicate and the cell value of "Emp.Core HR Id" column for that row as the object i.e.,
    http://example/Employee/EMP_123, Core_HR_Id, 123
    http://example/Employee/EMP_223, Core_HR_Id, 223
  Completion of the above style of D2RQ mappings for the remaining columns of the Employee table (Table 1) and then replicating similar mappings for the Employee Team and Employee Location tables in the example provides the necessary templates to enable the transformer process to operate on a relational row and transform it into the corresponding "raw triple" RDF representation depicted in Tables 4-6.

Artifact 2: Required RDF Output Classes. The RDF representation of the Knowledge triples in Tables 4-6 requires the definition of the RDF classes corresponding to "subject", "object" and RDF class properties corresponding to "predicate" in the final knowledge triple output.
  Declare all the relevant RDF "classes" where a RDF class is the RDF representation of a CL concept that a vertex is to be generated for in an externalized knowledge generate information graph.
example:Employee
  a owl:Class;
  rdfs:subClassOf owl:Thing. . . . . . Employee
  employeeFirstName data type property i.e. "class attribute predicate" for the Employee class above and so on for employeeLastName, employeeEmploymentNo, employeeHumanResourceID
example: employeeFirstName
  a owl:DatatypeProperty;
  rdfs:label "Employee First Name"
  rdfs: range xsd:string
example:Office
  a owl:Class;
  rdf:subClassOf owl:Thing.
example:Team a owl:Class;
  rdf:subClassOf owl:Thing.
example:EmployeeTeamMembership
  a owl:Class;
  rdf:subClassOf owl:Thing.

example:EmployeeOfficeLocation
    a owl:Class;
    rdf:subClassOf owl:Thing.
    Each of the above classes would also have "ObjectProperty" declarations as predicates representing their relationships to other classes. Using the last "EmployeeOfficeLocation" class declaration as an example,
    declare the predicate "employeeEmployeeOfficeLocation" that operates on the class (domain) EmployeeOfficeLocation (arg1) to associate it with an instance of Employee (arg2).
example:employeeEmployeeOfficeLocation
    a owl:ObjectProperty;
    rdfs:label "employee employee office location"
    rdfs:domain example:EmployeeOfficeLocation
    rdfs:range example:Employee
    Similarly with the predicate "officeEmployeeOfficeLocation" with arg1: EmployeeOfficeLocation and arg2: Employee.
example: officeEmployeeOfficeLocation
    a owl:ObjectProperty;
    rdfs:label "office employee office location"
    rdfs:domain example:EmployeeOfficeLocation
    rdfs:range example:Office
    These output classes will be generated from the raw triples using the third artifact required by the transformer process.
    Artifact 3: Transform Rules. The rules from the CL knowledge implementation drive the semantic transforms of raw triples to their knowledge driven representation. An example of the rules required for these types of transform are highlighted below. The rules presented are in a Jena format consistent with the WC3 Sematic Web Jena Java framework for constructing lightweight and scalable semantic web applications. Jena is an open source Apache project: http://jena.apache.org/ that provides a framework for building Semantic Web applications offering full integration with RDF, RDFS, OWL and SPARQL in line with WC3 specifications. Jena's support for WC3 Semantic Web standards and its frameworks capability to provide simple rules based processing of RDF triples in memory makes it a good implementation choice for the scale out semantic transforms. In some implementations, other frameworks can be used.

Example 1

TABLE 7A

Source: DB1 TABLE: Emp (Primary Key: Core HR Identity)

| First Name | Last Name | Employment Number | Core HR Id |
|---|---|---|---|
| Jon | Doe | 0050 | 123 |
| Jane | Doe | 0101 | 223 |

TABLE 7B

Source: DB1 TABLE: Emp

| Raw Triples | | | Knowledge Model Driven Triples | | |
|---|---|---|---|---|---|
| Subject (Row) | Predicate | Object | Employee | Predicate | Object |
| EMP_123 | First_Name | Joe | EMP_123 | employeeFirstName | Joe |

Predicate transform from "First Name" (Raw) to "employeeFirstName" (Knowledge Driven).
[DB1.EMP:
(?raw vocab: First Name ?firstname)
→
(?raw example:employeeFirstName ?firstname Example 2

TABLE 8A

Source: DB2 TABLE: Emp Loc (Primary Key: Core HR Identity)

| Core HR Id | Office | Start Date | End Date |
|---|---|---|---|
| 123 | Office1 | Nov. 1, 2013 | INFINITY |
| 223 | Office1 | Nov. 1, 2012 | INFINITY |

TABLE 8B

Source: DB2 TABLE: Emp Loc

| Raw Triples | | | Knowledge Model Driven Triples | | |
|---|---|---|---|---|---|
| Subject (Row) | Predicate | Object | EmployeeOfficeLocation | Predicate | Object |
| EMP_LOC_123 | Core_HR_Id | 123 | EMP_LOC_123_Office1_11/1/13 | employeeEmployeeOfficeLocation | EMP_123 |

Use the D2RQ mappings for the Emp Loc table and its, Office, Start Date and Core HR Id columns to create the employeeLocationURI subject, employeeURI object with a employeeEmployeeOfficeLocation predicate

[Emp Location URI:
(?raw rdf:type vocab: DB2_EMP_LOC)
(?raw vocab:DB2_EMP_LOC_OFFICE ?office),
(?raw vocab:DB2_EMP_LOC_START_DATE ?startdate),
(?raw vocab:DB2_EMP_LOC_CORE_HR_ID ?corehrid),
uriConcat("http://example/Employee/EMP_LOC_", ?corehrid, "_", ?office, "_", ?startdate, ?employeeLocationURI)
uriConcat ("http://example/Employee/EMP_", ?corehrid, ?employeeURI
→
(? employeeLocationURI, example: employeeEmployeeOfficeLocation, ?employeeURI)

Create the required Knowledge Model Driven Triple,
http://example/Employee/EMP_LOC_123_Office1_11/1/13,
employeeEmployeeOfficeLocation, http://example/Employee/EMP_123

Figure 5:
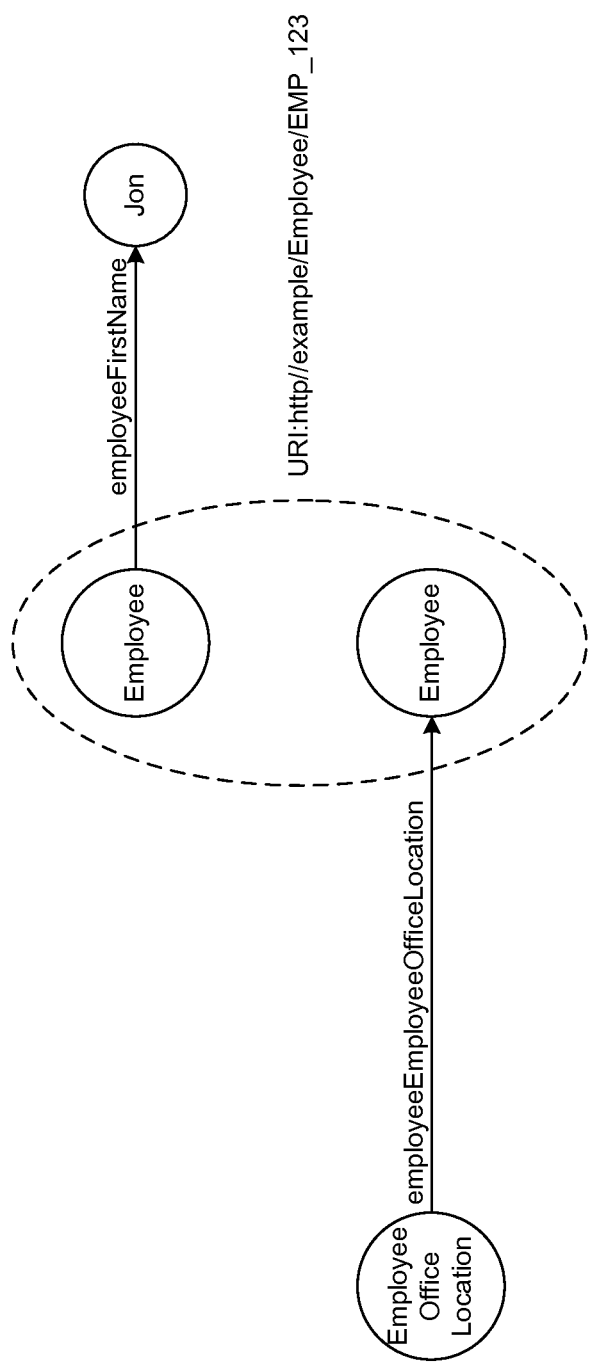
FIG. 5 is a graphical diagram illustrating aligning of graph vertices using Common Resource Description Framework (RDF) Uniform Resource Identifiers (URIs) in accordance with the some embodiments of the disclosed technology.

Referring to FIG. 5, from a RDF graphing perspective, example 1 generated an RDF triple representing the edge "employeeFirstName" relationship between a vertex "employee" instance and a vertex "first name" instance ("Jon"). Example 2 extended this graph by aligning its object employeeURI with the "URI: http//example/Employee/EMP_123" of an existing "employee" vertex and inserting a new "employeeEmployeeOfficeLocation" edge from it to a new "employee office location" vertex.

Figure 6:
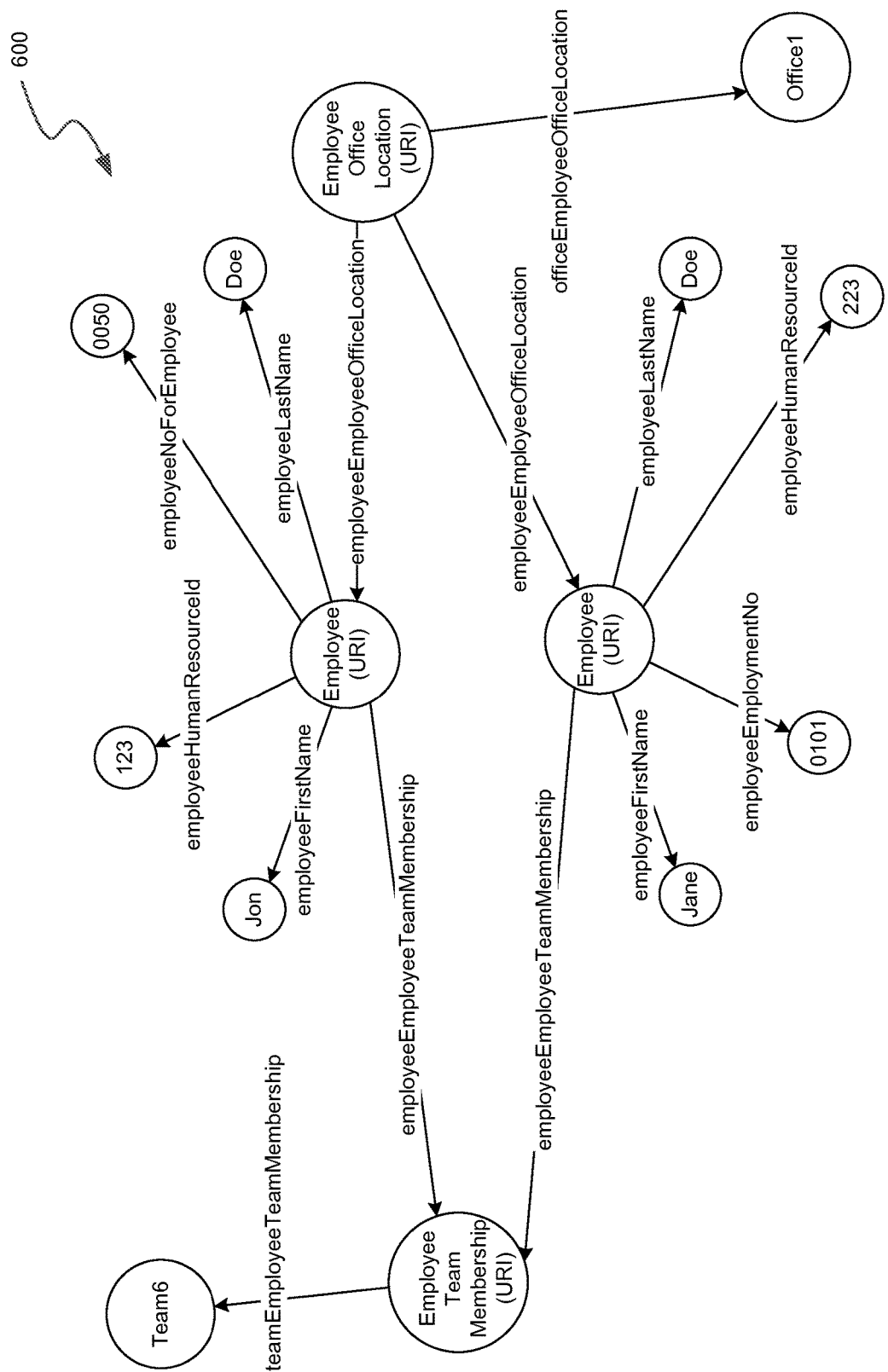
FIG. 6 is a graphical diagram illustrating a partial information graph in accordance with the some embodiments of the disclosed technology.

Execution of similar semantic transforms for all the sample relational data in Tables 4-6 would yield the complete set of knowledge driven RDF triples (from Table 4-6) required to create the fully converged graphical representation 600 of the same data shown in FIG. 6.

The resulting triples (i.e., knowledge driven RDF triples) represent a semantically consistent and fully normalized graphical representation of explicitly targeted and otherwise disparate relational data. In some embodiments, the partially complete information graphs (e.g., the graph 600 in FIG. 6) that would be created via loading these triples into enterprise RDF triple stores are capable of supporting:

direct SPARQL query access,
link analysis other styles of statistical graph analytics, and/or
integration as an information source to knowledge implementation inference.

These capabilities make the information graphs valuable enterprise information sources in their own right. Moreover, these graphs provide a fully normalized and semantically consistent representation of what would otherwise be semantically inconsistent and disparate enterprise data.

In some embodiments, the final step in the knowledge driven lifecycle is to enrich the partial information graphs with new relationships that can be created by applying the relevant forward assertions from the knowledge implementation.

1.6.4 Using a Knowledge Contract to Generate New Enterprise Information

The knowledge model formally represents the concepts of an employee, relationships and their definitional rules. The information generated by applying this knowledge to enterprise data thus far has served to build an information foundation. In some embodiments, that foundation can be used in combination with the forward rules from the knowledge model to inference new information. Consider an example forward assertion from the example CL knowledge implementation and its English translation below.

IF Two different Employees have the same employeeTeamMembership and the same employeeOfficeLocation
THEN Create a new officeTeamCoWorker relationship between them.
Direction: Forward
(Implies
    (and
    (employeeTeamMembership ?Employee1 ?Team1)
    (employeeTeamMembership ?Employee2 ?Team1)
    (Different ?Employee1 ?Employee2)
    (employeeOfficeLocation ?Employee1 ?Office1)
    (employeeOfficeLocation ?Employee2 ?Office1)
    )
(officeTeamCoWorker ?Employee1 ?Employee2))

Figure 7:
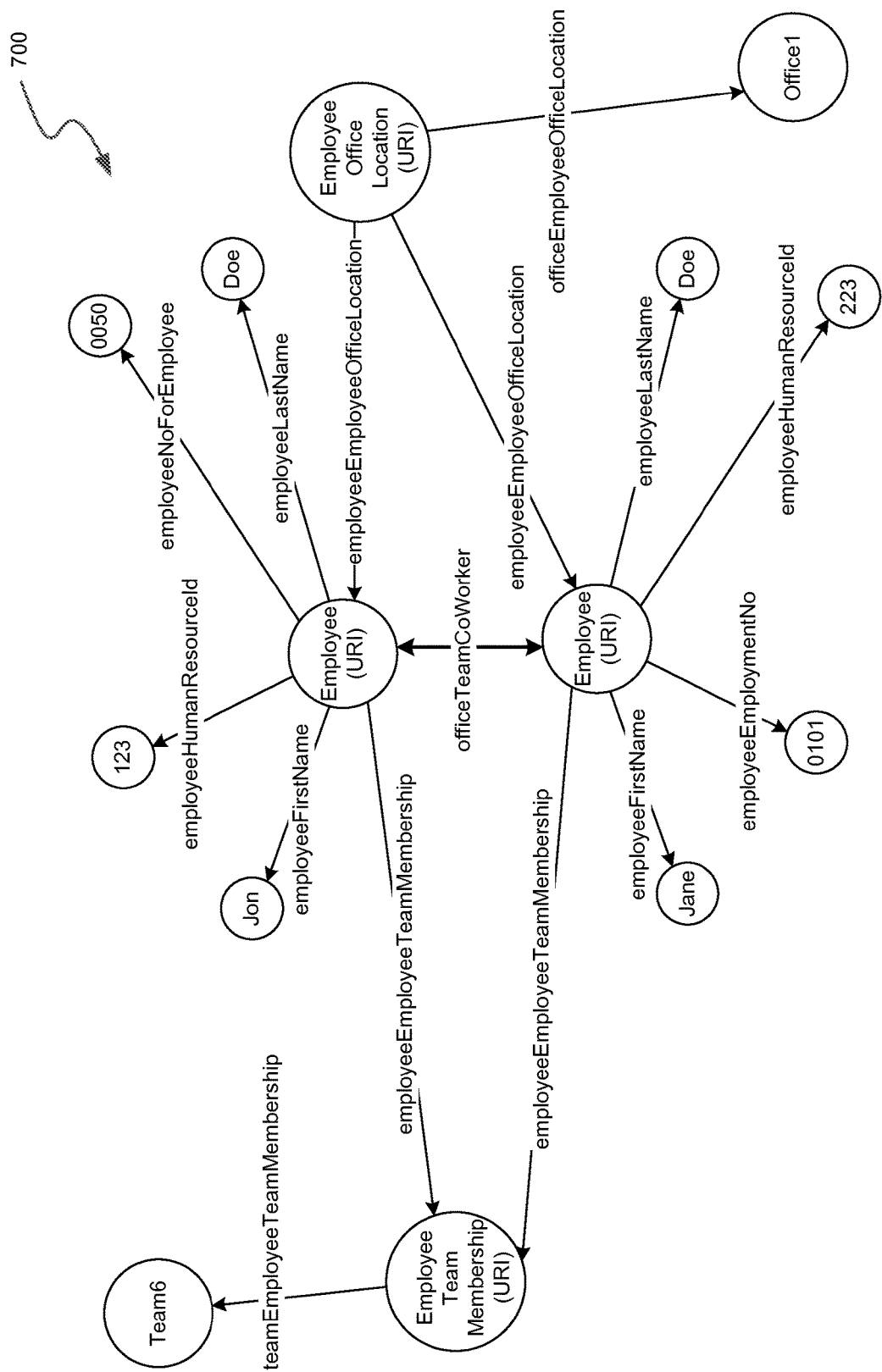
FIG. 7 is a graphical diagram illustrating a forward enriched knowledge driven information graph in accordance with some embodiments of the disclosed technology.

The information foundation generated in section 1.6.4, FIG. 5 shares the same knowledge heritage and semantic frame of reference as the above assertion. The officeTeamCoWorker represents a new edge in the information graph that can be created by exporting the assertion as a rule that the graphical information representation 700 can execute, as shown in FIG. 7.

The vertex scope of an information graph is generally fixed at a point in time by the functional scope of the knowledge model. The ability to create a vertex as an instance of a concept like Employee, Employee Team Membership etc., directly correlates to the ability to resolve it from underlying authoritative data. Over time inductive, observational and/or other techniques can enable recognition of new data patterns and structures that can feed back into the knowledge model as new concepts with associated data mappings. Generally, there is no functional need to forward inference new concepts and the scale out information generation methodology (section 1.6.3) is generally complete and highly efficient strategy for generation of enterprise vertices.

The observations on the types of edges created thus far have highlighted three main categories:

1. Managed relationships between core concepts and attribute value vertices.
    (Example: Employee→employeeFirstName→Name)
2. Managed relationships edges between core concept vertices.
    (Example: Employee→employeeEmployeeTeamMembership→EmployeeTeamMembership)
3. Inference relationships based on patterns between existing edges and vertices.
    (Example: Employee→officeTeamCoWorker→Employee [based on pattern represented by forward rule above])

In some embodiments, while categories 1 and 2 are resolved directly from data and can therefore be efficiently created using the scale out methodology of section 1.6.3, the same is generally not possible for the third category representing the officeTeamCoWorker example. It requires the pre-creation of all Employee's and their Team and Office relationships.

This final phase of knowledge driven information graph generation is the scale up phase. In this phase, the knowledge driven RDF triples created via the scale out transforms are loaded in to a triple store with a graph generation capability (e.g., a graph generator). The graph generator can accept the forward rule information patterns and use them to identify and generate the appropriate inference edges to represent them. Graphs and graph enrichments that can fit into memory can leverage significant advances in memory architectures that can be found in specialized hardware solutions such as SGI UV™ and integrated big memory graph generation solutions such as YarcData Ureka™.

The WC3 RDF graph query language SPARQL supports operations such as SELECT, CONSTRUCT, INSERT and DELETE. The SPARQL representation of the forward rule would be an insert instruction substantially similar to:

INSERT
{
?Employee1 officeTeamCoWorker ?Employee2
}
WHERE
{
?Employee1 employeeTeamMembership ?Team1
?Employee2 employeeTeamMembership ?Team1
?Employee1 employeeOfficeLocation ?Office1
?Employee2 employeeOfficeLocation ?Office1
FILTER(?Employee1 !=?Employee2)
}

In response to the above instruction, the executing triple store can search through all existing edges locating all employee vertices that match the graph pattern in the "WHERE" clause (FIG. 6) and then apply the "different employee" "FILTER" to insert the required "officeTeamCoWorker" edges (FIG. 7). The information graph 700 of FIG. 7 is thus a complete information graph that includes the inferred relationship that two of the employees are office team co-workers.

For graphs sizes that can fit into memory, ranging from many millions to many billions of edges, there are significant performance advantages leveraging a specialized in-memory triple store implementation as a graph generation service. The knowledge driven RDF triples representing the knowledge domain[s] of interest can be streamed or bulk loaded into the graph generator that builds a consolidated graphical representation in memory that it then exposes as a SPARQL endpoint. The knowledge based inference rules can then be applied to this endpoint as SPARQL "INSERTS" driving the creation of the relevant new edges. The enriched graph can then be streamed back to the information layer as additional knowledge driven RDF triples.

1.6.5 Knowledge Contracts, Information Graphs and Unstructured Data

There are many different definitions of structured and unstructured data. The examples thus far have described how knowledge can be applied to the most prolific source of structured enterprise data, namely data organized and managed within the canonical constraints of the tables, rows and columns of relational databases. Unstructured enterprise data does not have an easily discernable canonical representation, requiring structure to be created as part of the enterprise information generation process.

Consider the example of text communication, documents, news or the plethora of text based messages logged by technology processes within an information technology ecosystem. While such content exhibit basic structure such as author or creator, recipient, creation time, etc., natural language processing (NLP) can be used to create content structure for the associated body of content. NLP can be based on a broad range of techniques ranging from simple pattern matching to complex statistical techniques. However, a targeted knowledge driven integration with information agents implementing these techniques can enhance their retrieval of relevant information as illustrated by the example shown in FIG. 4, section 1.6. The communication relationships shown in the information graph 400 only indicate the potential as opposed to an actual communication of non-public information. As illustrated, creation of some of the communication relationships such as "communicatesEmail" and "communicatesIM" is made possible by enabling NLP of unstructured data such as emails and instant messages.

In some embodiments, the knowledge model can be extended to represent the concepts of deal, company, security, and their relationship to canonical synonyms and associated variants such as exchange ticker symbol to security etc. That could enable an associated knowledge driven NLP information agent to include relevance in the inference of a communication relationship. The focus on the WC3 Semantic RDF stack as an integration protocol between the layers of the knowledge architecture further reinforces the opportunity to use enterprise knowledge to drive the efficiency of third party information agents. In some embodiments, enterprise semantic search engines share many of the same knowledge integration opportunities as NLP to optimize the retrieval and relevance of end user information output.

1.7 Overview of the Knowledge System and Information Agents

Figure 8:
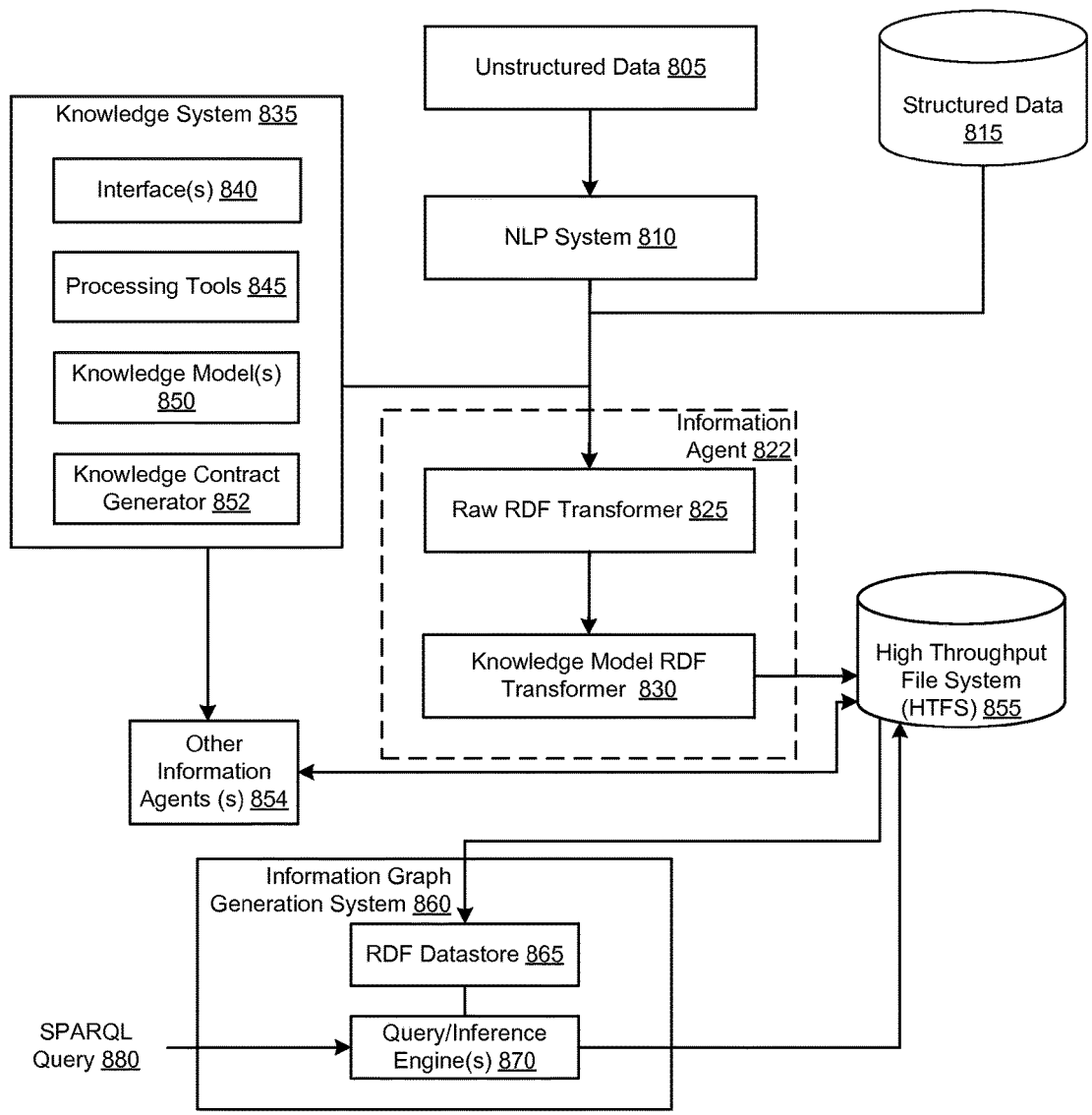
FIG. 8 is a block diagram illustrating a knowledge system coupled to information agents in accordance with some embodiments of the disclosed technology.

FIG. 8 is a block diagram illustrating a knowledge system coupled to information agents in accordance with some embodiments of the disclosed technology. In some embodiments, unstructured data 805, structured data 815, and/or semi-structured data (not shown) from various data sources that together comprise the L1 data layer of the cognitive platform illustrated in FIG. 3 can be processed based on a knowledge model. An NLP system 810 can accept unstructured data 805 and convert the unstructured data 805 to a structured form for knowledge model transforms.

In some embodiments, the knowledge system 835 is the knowledge implementation based on Common Logic (CL) or other suitable Ontology languages. The knowledge system 835 is the authoritative source of knowledge and provides the necessary concepts, relationships and rules in the form of machine-readable "knowledge contracts" that can be used by applications to generate and enrich information graphs. In some embodiments, the knowledge system 835 includes various interfaces 840 (e.g., user interface, communication interface for interfacing with information agents and/or applications) and processing tools 845 that generate knowledge models 850. In some embodiments, the knowledge system 835 may include an integrated knowledge store that stores information structures (e.g., knowledge model RDF triples) and an inference engine that infers new information structures. In other embodiments, the knowledge system 835 can include a knowledge contract generator 852 that extends the knowledge model 850, and generates a knowledge contract from the extended knowledge model 850. The knowledge contract comprises mappings and transform rules that can be transmitted in machine-readable form to autonomous information agents (e.g., information agent 822). The autonomous information agent 822 can be implemented in a parallel processing environment such as Hadoop. Each instance of the autonomous information agent 822 can include a raw RDF transformer 825 that receives as input source data of interest (e.g., from structured data 815, unstructured data 805 after NLP), applies raw RDF triple mappings provided by the knowledge contract to transform the identified source data into raw RDF triples. Each instance of the autonomous information agent 822 also includes a knowledge model RDF transformer 830 that receives as input the raw RDF triples output by the raw RDF transformer 825 and applies semantic transform rules provided by the knowledge contract to output knowledge model RDF triples. The knowledge model RDF triples represent information structures or information objects that are normalized and semantically consistent with the knowledge model 850. The knowledge model RDF triples output by the knowledge model RDF transformer 830 are written to a suitable high throughput file system (HTFS) 855 in some embodiments.

As illustrated, the knowledge system 835 can interface with other information agents 854 such as semantic search engines, disambiguation engines, or the like. One example information agent is the information graph generator 860. The knowledge model RDF triples stored in the HTFS 855 can be loaded into the RDF datastore 865 of the information graph generation system 860 (e.g., via a loader component not shown). The RDF datastore 865 is generally a high performance in-memory datastore. The information graph generation system 860 also include one or more query/inference engine(s) 870 that can accept as input a forward inference rule, typically in the form of a query statement (e.g., SPARQL query) 880. The inference engine 870 executes the query statement on the knowledge model RDF triples in the RDF datastore 865 to infer new relationships. The results from the inference engine 870 (i.e., inferred knowledge model RDF triples 885) are returned to the HTFS 855 to be added to the collection of knowledge model RDF triples stored in the HTFS 855 in some embodiments.

1.8 Example Methods

Figure 9:
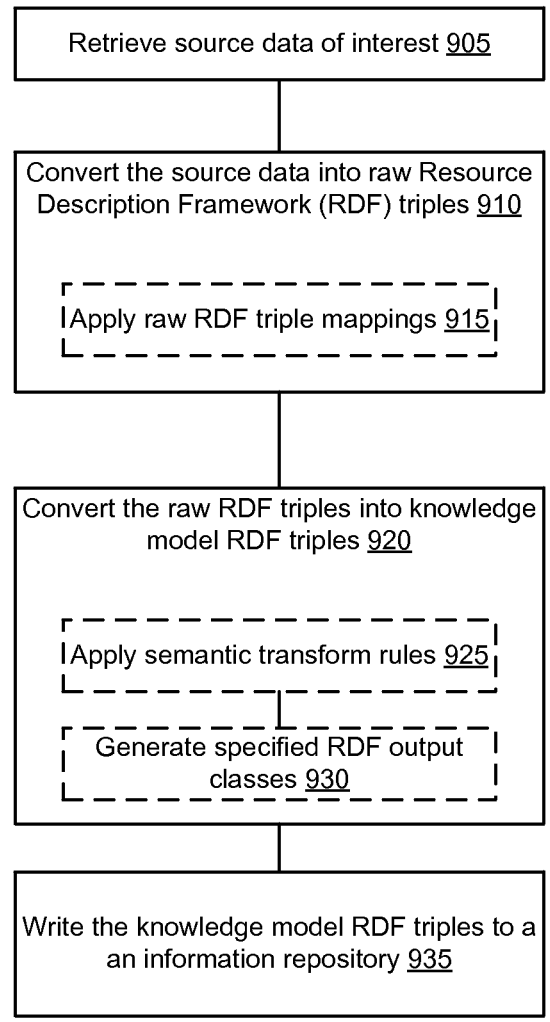
FIG. 9 is a logic flow diagram illustrating an example method of creating knowledge model RDF triples from source data of interest based on a knowledge model in accordance with some embodiments of the disclosed technology.

FIG. 9 is a logic flow diagram illustrating an example method of creating knowledge model RDF triples from source data of interest based on a knowledge model in accordance with some embodiments of the disclosed technology.

As used herein, the term "agent" refers to a mechanism manifested as software, firmware, hardware or any combination therewith. In some embodiments, an autonomous information agent (e.g., agent 822 in FIG. 8) retrieves relevant source data of interest. At block 910, the autonomous information agent converts the source data into raw RDF triples. In some embodiments, the autonomous information agent applies raw RDF triple mappings at block 915 to the source data to obtain the raw RDF triples. The mapping information can be transmitted by the knowledge system as a part of a knowledge contract. At block 920, the autonomous information agent converts the raw RDF triples into knowledge model RDF triples. The conversion is based on application of semantic transform rules 925 and generation of specified RDF output classes 930 provided by the knowledge contract from the knowledge system. At block 935, the autonomous information agent writes the knowledge model RDF triples to an information repository (e.g., the HTFS file system 855 in FIG. 8). The collection of knowledge model RDF triples in the information repository can then be leveraged for inferring or discovering new relationships, performing searches, analytics, and/or other applications.

Figure 10:
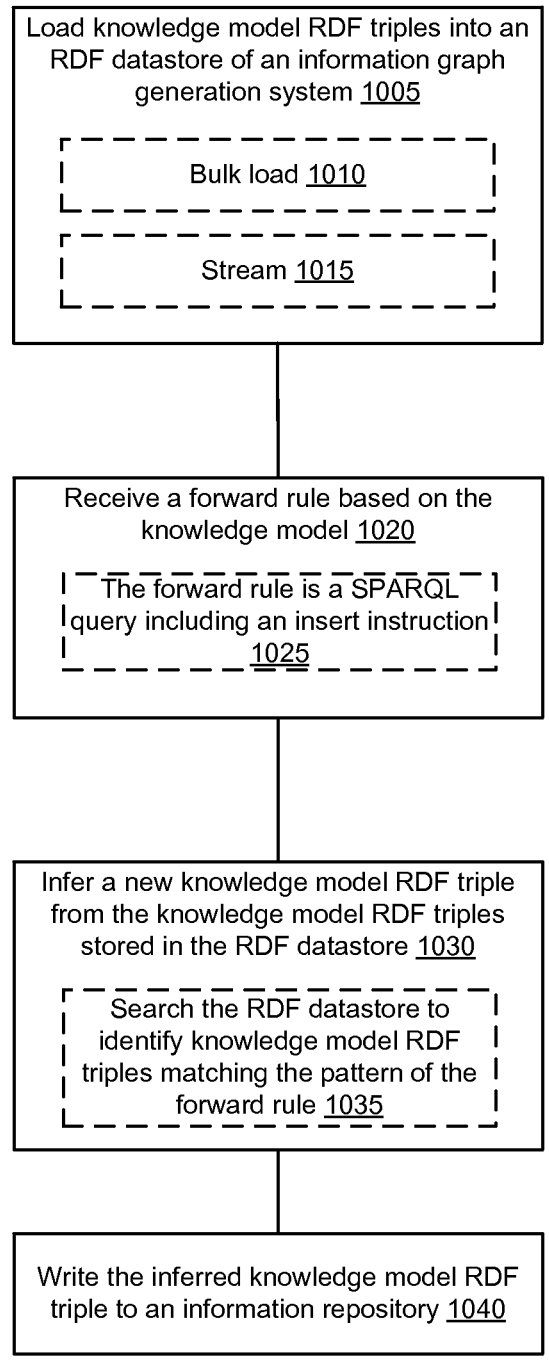
FIG. 10 is a logic flow diagram illustrating an example method of inferring a new knowledge model RDF triple from a collection of knowledge model RDF triples stored in an RDF datastore of an information graph generation system in accordance with some embodiments of the disclosed technology.

FIG. 10 is a logic flow diagram illustrating an example method of inferring a new knowledge model RDF triple from a collection of knowledge model RDF triples stored in an RDF datastore of an information graph generation system (e.g., information graph generation system 860 in FIG. 8) in accordance with some embodiments of the disclosed technology.

The knowledge model RDF triples can be loaded into an RDF datastore of the information graph generation system at block 1005 (e.g., by a loader component). The knowledge model RDF triples can be loaded in bulk 1010, or streamed 1015 into the RDF datastore. At block 1020, an inference engine of the information graph generation system can receive a forward rule based on the knowledge model. The forward rule can be a SPARQL query including an "insert" instruction 1025. At block 1030, the information graph generation system can execute the query against the knowledge model RDF triples in the RDF datastore to infer a new knowledge model RDF triple. Inferring the new knowledge model RDF triple can include searching the RDF datastore to identify knowledge model RDF triples matching the pattern of the forward rule 1035. In some embodiments, at block 1040, the information graph generation system can add the new knowledge model RDF triple to a collection of knowledge model RDF triples in an information repository (e.g., the HTFS 855).

In various embodiments, the disclosed technology can be implemented on a distributed processing environment or system such as the Apache Hadoop project (hereinafter "Hadoop") which is an open-source software framework for developing software for reliable, scalable and distributed processing of large data sets across clusters of commodity machines. Hadoop includes a distributed file system, known as Hadoop Distributed File System (HDFS). HDFS links together the file systems on local nodes to form a unified file system that spans the entire Hadoop cluster and can store structured and/or unstructured data in various formats. In some embodiment, transforms for converting source data into normalized and semantically consistent information structures can be implemented on Hadoop.

1.9 Example Computer Systemization

Figure 11:
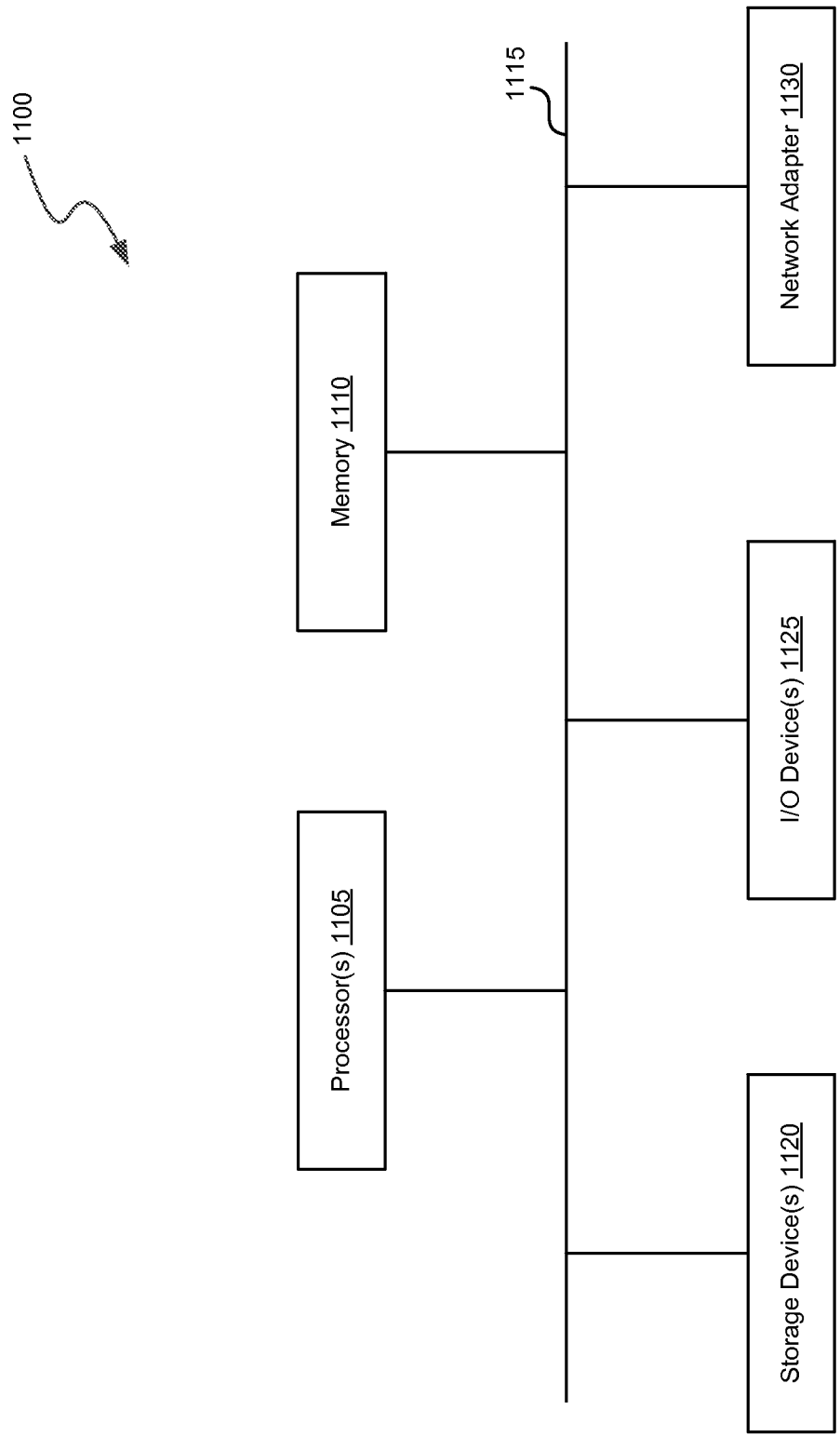
FIG. 11 is a block diagram of an exemplary apparatus that may perform various operations, and store various information generated and/or used by such operations, according to an embodiment of the disclosed technology.

FIG. 11 is a block diagram of an exemplary apparatus that may perform various operations, and store various information generated and/or used by such operations, according to an embodiment of the disclosed technology.

The apparatus 1100 can represent any computer system described herein. The computer 1100 is intended to illustrate a hardware device on which any of the entities, components or services depicted in the examples of FIG. 8 (and any other components described in this specification) can be implemented, such as a, a server, client, storage devices, databases, knowledge system, information graph generation system, etc. The computer 1100 includes one or more processors 1105 and memory 1110 coupled to an interconnect 1115. The interconnect 1115 as shown in FIG. 11 can represent any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus, also called "Firewire," and/or the like.

The processor(s) 1105 is/are the central processing unit (CPU) of the computer 1100 and, thus, control the overall operation of the computer 1100. In certain embodiments, the processor(s) 1105 accomplish this by executing software or firmware stored in memory 1110. The processor(s) 1105 may be, or may include, one or more programmable generalpurpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1110 is or includes the main memory of the computer 1100. The memory 1110 represents any form of random access memory (RAM), read-only memory (ROM), flash memory, or the like, or a combination of such devices. In use, the memory 1110 may comprise a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 1105 through the interconnect 1115 are a network adapter 1130, a storage device(s) 1120 and I/O device(s) 1125. The network adapter 1130 provides the computer 1100 with the ability to communicate with remote devices, over a network and may be, for example, an Ethernet adapter or Fibre Channel adapter. The network adapter 1130 may also provide the computer 1100 with the ability to communicate with other computers within the cluster. In some embodiments, the computer 1100 may use more than one network adapter to deal with the communications within and outside of the cluster separately.

The I/O device(s) 1125 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 1110 can be implemented as software and/or firmware to program the processor(s) 1105 to carry out actions described above. In certain embodiments, such software or firmware may be initially provided to the computer 1100 by downloading it from a remote system through the computer 1100 (e.g., via network adapter 1130).

The embodiments and implementations of the technology disclosed herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the technology disclosed herein may be stored on a machine-readable storage medium and may be executed by one or more general-purpose or special-purpose programmable microprocessors. A "machine-readable storage medium," as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a web appliance, a graph data appliances, a network router, switch or bridge, or any machine capable of executing a set of instructions (sequential or otherwise) that specify actions to be taken by that machine.

A machine-accessible storage medium or a storage device(s) 1120 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

2.0 CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments and implementations have been described herein for purposes of illustration, but that various modifications may be made without deviating from the spirit and scope of the embodiments and implementations. Accordingly, the embodiments and implementations are not limited except as by the appended claims.

What is claimed is:

1. A method comprising:
   retrieving, by at least one processor in a distributed parallel processing environment, source data from a datastore;
   converting, by the at least one processor, the source data into raw Resource Description Framework (RDF) triples by applying RDF triple mapping language;
   converting, by the at least one processor, the raw RDF triples into knowledge model RDF triples by applying semantic transform rules provided by a knowledge model, wherein the knowledge model RDF triples provide normalized and semantically consistent representations of the source data;
   writing, by the at least one processor, the knowledge model RDF triples to a high throughput file system;
   obtaining, by the at least one processor, a forward inference rule, including a pattern of knowledge concepts and relationships, from the knowledge model;
   searching, by the at least one processor, the knowledge model RDF triples based on the pattern of knowledge concepts and relationships; and
   inferring, by the at least one processor, a new knowledge model RDF triple based on identification of the pattern,
   wherein converting the raw RDF triples into the knowledge model RDF triples includes generating specified RDF output classes.

2. The method of claim 1, further comprising loading the knowledge model RDF triples into an RDF triple store.

3. The method of claim 2, wherein the knowledge model RDF triples are in the RDF triple store.

4. The method of claim 3, further comprising writing the new knowledge model RDF triple to the high throughput file system.

5. The method of claim 3, wherein the forward inference rule is a SPARQL query including an insert instruction.

6. A system comprising:
   at least one processor in a distributed parallel processing environment, the at least one processor configured to:
   retrieve source data from a datastore;
   convert the source data into raw Resource Description Framework (RDF) triples by applying RDF triple mapping language;
   convert the raw RDF triples into knowledge model RDF triples by applying semantic transform rules provided by a knowledge model, wherein the knowledge model RDF triples provide normalized and semantically consistent representations of the source data;
   write the knowledge model RDF triples to a high throughput file system;
   obtain, from the knowledge model, a forward inference rule including a pattern of knowledge concepts and relationships;
   search the knowledge model RDF triples based on the pattern of knowledge concepts and relationships; and
   infer a new knowledge model RDF triple based on identification of the pattern,
   wherein, to convert the raw RDF triples into the knowledge model RDF triples, the at least one processor is configured to generate specified RDF output classes.

7. The system of claim 6, wherein the at least one processor is further configured to load the knowledge model RDF triples into an RDF triple store.

8. The system of claim 7, wherein the knowledge model RDF triples are in the RDF triple store.

9. The system of claim 8, wherein the at least one processor is further configured to write the new knowledge model RDF triple to the high throughput file system.

10. The system of claim 8, wherein the forward inference rule is a SPARQL query including an insert instruction.

11. A non-transitory computer readable medium storing instructions that, when executed by a processor, cause the processor to:
    retrieve source data from a datastore;
    convert the source data into raw Resource Description Framework (RDF) triples by applying RDF triple mapping language;
    convert the raw RDF triples into knowledge model RDF triples by applying semantic transform rules provided by a knowledge model, wherein the knowledge model RDF triples provide normalized and semantically consistent representations of the source data;
    write the knowledge model RDF triples to a high throughput file system;
    obtain a forward inference rule, including a pattern of knowledge concepts and relationships, from the knowledge model;
    search the knowledge model RDF triples based on the pattern of knowledge concepts and relationships; and
    infer a new knowledge model RDF triple based on identification of the pattern,
    wherein the instructions that when executed cause the processor to convert the raw RDF triples into the knowledge model RDF triples include instructions that when executed cause the processor to generate specified RDF output classes.

12. The non-transitory computer readable medium of claim 11, wherein the instructions, when executed, further cause the processor to load the knowledge model RDF triples into an RDF triple store.

13. The non-transitory computer readable medium of claim 12, wherein the knowledge model RDF triples are in the RDF triple store.

14. The non-transitory computer readable medium of claim 13, wherein the instructions, when executed, further cause the processor to write the new knowledge model RDF triple to the high throughput file system.

15. The non-transitory computer readable medium of claim 13, wherein the forward inference rule is a SPARQL query including an insert instruction.

16. The method of claim 1, further comprising writing the new knowledge model RDF triple to the high throughput file system.

17. The method of claim 1, wherein the forward inference rule is a SPARQL query including an insert instruction.

18. The system of claim 6, wherein the at least one processor is further configured to write the new knowledge model RDF triple to the high throughput file system.

19. The system of claim 6, wherein the forward inference rule is a SPARQL query including an insert instruction.

20. The non-transitory computer readable medium of claim 11, wherein the instructions, when executed, further cause the processor to write the new knowledge model RDF triple to the high throughput file system.

* * * * *